(12) United States Patent  
Ferguson

(10) Patent No.: US 6,520,393 B1
(45) Date of Patent: Feb. 18, 2003

(54) TILTABLE ROOFTOP CARGO CARRIER FOR A VEHICLE

(76) Inventor: Alan C. Ferguson, 1468 Skyharbor Dr., Suite J, Marysville, CA (US) 95901

( * ) Notice: Subject to any disclaimer, the term of this patent is extended or adjusted under 35 U.S.C. 154(b) by 0 days.

(21) Appl. No.: 09/309,388

(22) Filed: Jul. 9, 1999

Related U.S. Application Data

(63) Continuation-in-part of application No. 08/939,886, filed on Sep. 29, 1997, now abandoned.

(51) Int. Cl.[7] .................................................. B60R 9/00
(52) U.S. Cl. ...................................... 224/310; 224/321
(58) Field of Search ................................ 224/309, 310, 224/321; 414/462

(56) References Cited

U.S. PATENT DOCUMENTS

| | | |
|---|---|---|
| 2,318,971 A | 5/1943 | Roumage et al. |
| 2,746,628 A | 5/1956 | Neyra |
| 2,815,252 A | 12/1957 | Baker |
| 2,840,290 A | 6/1958 | Roberts |
| 3,186,569 A | 6/1965 | Roux |
| 3,193,124 A | 7/1965 | Essling |
| 3,384,244 A | 5/1968 | Falek |
| 3,460,694 A | 8/1969 | Simms |
| 3,495,729 A | 2/1970 | Kruse |
| 4,081,095 A | 3/1978 | Wilburn et al. |
| 4,260,314 A | 4/1981 | Golze |
| 4,329,100 A | 5/1982 | Golze |
| 4,339,223 A | 7/1982 | Golze |
| 4,350,471 A | 9/1982 | Lehman |
| 4,826,387 A | 5/1989 | Audet |
| 4,871,103 A | 10/1989 | Martinsson |
| 5,417,358 A | 5/1995 | Haselgrove |
| 5,494,327 A | 2/1996 | Derecktor |

FOREIGN PATENT DOCUMENTS

| | | |
|---|---|---|
| DE | 3626896 | 2/1988 |
| EP | 101054 | 2/1984 |
| FR | 2596344 | 10/1987 |
| FR | 2673404 | 9/1992 |
| GB | 2118501 A | 11/1983 |
| JP | 406099776 A | 4/1994 |
| NL | 8004228 | 9/1981 |

*Primary Examiner*—Nathan J. Newhouse

(57) ABSTRACT

A vehicle cargo carrier including a cargo platform for placement of cargo thereon, the platform supported by a lower support base affixed atop a vehicle which allows the platform to be manually drawn laterally outward and then to be pivoted from generally horizontal into a tilt along side the vehicle for easier reach. Low-friction plastic strips mounted on surfaces of the cargo carrier provide low friction sliding of the platform on the support base. Low-friction lateral guidance plastic strips extending into the area of pivot studs maintain lateral alignment when the cargo platform is tilted relative to the support base. The pivot studs on which the platform tilts are intermediately or non-edgewardly positioned of the platform to allow placement of cargo on the cargo platform on each side of the pivotal axis so that the weight of the cargo is distributed to aid the user in tilting the platform back toward horizontal. Tilt-stops, preferably adjustable, are applied between the ends of the support base and the underside of the platform to prevent the tilted platform from striking the vehicle and to set a predetermined maximum tilt angle. Manually de-latchable latches are mounted on the cargo carrier to engage between the platform and support base for holding the platform in a retracted position allowing driving of the vehicle.

3 Claims, 13 Drawing Sheets

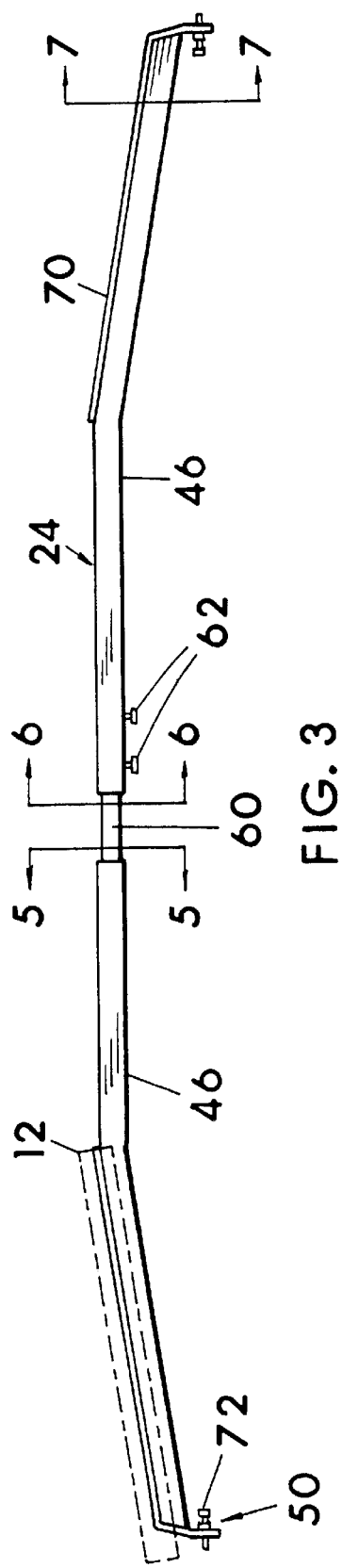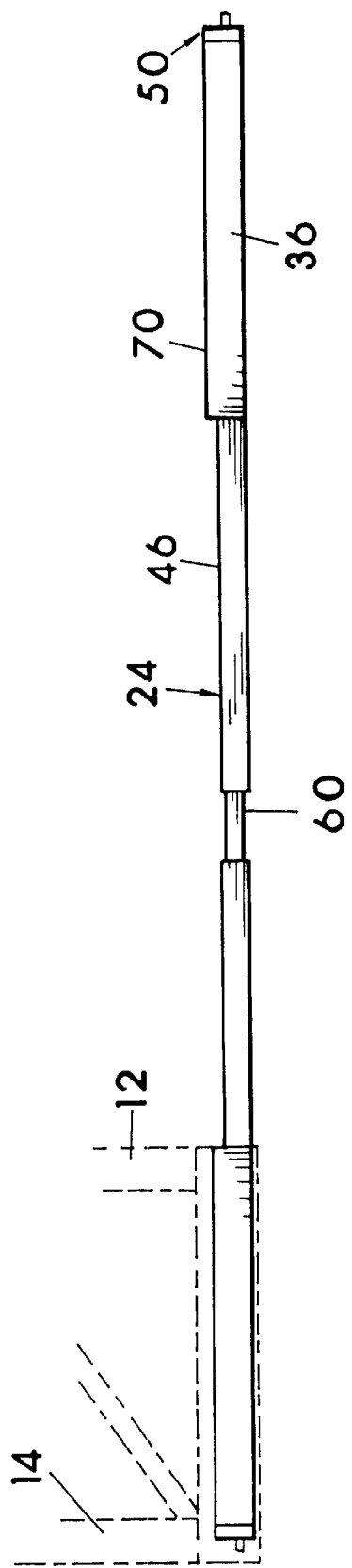

TILTABLE ROOFTOP CARGO CARRIER FOR A VEHICLE

This application is a continuation-in-part of my prior complete U.S. non-provisional patent application No. Ser. 08/939,886 filed Sep. 29, 1997, now abandoned, to which the benefit of the earlier filing date for the common matter is claimed.

BACKGROUND OF THE INVENTION

1. Field of the Invention

This invention relates to cargo carriers which mount atop motor vehicles such as cars, passenger and utility vans, and over the cargo beds of pick-up trucks and the like; and which are commonly used to carry ladders, snow and water skis, snow boards, luggage, camping gear, pipe, small boats and the like positioned above the vehicle rooftop and exterior of the vehicle. The present invention includes a non-jamming or smooth operating tiltable cargo support platform preferably having an intermediate or non-edgeward rotational axis.

2. Description of the related Prior Art

The majority of in-use prior art rooftop-mount cargo carriers on land motor vehicles are mounted entirely stationary and generally centered from side to side on the exterior roof of the vehicle. Many such prior art stationary cargo carriers utilize the top of the vehicle as the platform upon which the cargo directly rests, and only provide elevated side rails for which to tie the cargo stationary with ropes, elastic cords or the like, while others provide a slightly raised but stationary platform or system of rails on which to rest and secure cargo. The stationary mounting of cargo carriers on vehicle rooftops creates weight limiting, reach and safety problems particularly on taller vehicles such as vans and all-terrain four wheel drive vehicles. Such vertically tall vehicles having stationary cargo carriers mounted atop the roof are extremely difficult to reach to load and unload cargo due to the height of the vehicle. The width of any land motor vehicle, even vertically low vehicles such as small cars, also makes loading cargo atop a stationary rooftop carrier difficult. To load or unload cargo from typical stationary prior art rooftop cargo carriers, particularly when mounted on taller vehicles, the user must generally find a ladder to stand on, or more commonly stand in an open doorway of the vehicle and hold-on to the vehicle or cargo rack with one hand to prevent falling, and load or unload cargo with the one free hand and arm. The one-handed loading procedure is not only somewhat awkward and unsafe due to the risk of slipping and injuring oneself, but has a tendency to limit, by the very nature of using one hand, the amount of weight which can be easily loaded.

Some prior art vehicle rooftop cargo carriers are designed to attempt to solve this "reach" problem associated with stationary rooftop cargo carriers by way of providing cargo support platforms which move atop lower stationary tracks or platform support bases. Such movable cargo support platforms typically tilt from a normally generally horizontal position downward into a tilted position along side the vehicle after being moved laterally outward relative to the vehicle and platform support base. With these tiltable prior art vehicle cargo carriers, the stationary support base is mounted stationary atop and normally generally centered on the vehicle exterior roof, and the movable cargo support platform slides or rolls relative to the support base, moving typically to one side of the vehicle to clear the vehicle side sufficiently to allow downward tilting of the cargo platform.

It should be noted that in some of the prior art sliding cargo platforms, the support base can be positioned so that the platform moves toward the rear side of the vehicle. With some slidable and tiltable cargo carriers, the sliding and tiltable portion must move to the rear of the vehicle in order for the cargo support platform to be long enough to reach the ground, since if the movable cargo support platform were only the width of a vertically high vehicle then the platform would not be long enough to reach the ground unless complicated and more expensive telescopic structuring were provided, as is provided with some prior art structurings of vehicle cargo carriers.

A problem associated with many of these prior art laterally movable and tiltable cargo platforms for vehicles typically exist in the area pertaining to how they tilt after being moved laterally, or in other words, the location of the tilt pivot point (rotational axis) relative to the cargo carrying area of the cargo support platform. Usually the pivot point is located at the extreme upper edge of the cargo support platform on such prior art tilt-down vehicle cargo carriers when the cargo platform is in the fully tilted state. With cargo support platforms which pull outward and then tilt downward on an extreme endwardly positioned tilt or rotational axis, the user can stand in front of or to the side of the downward tilted cargo support platform and normally more easily attach cargo, however, if the cargo is of any significant weight, the user will then have a difficult task in lifting the cargo laden cargo support platform vertically to bring it to a horizontal elevated position prior to pushing the cargo support platform horizontally toward the center of the vehicle where the platform rests in a locked transport position atop the stationary base. This lifting or tilting back to horizontal of a cargo laden and downward tilted cargo support platform can be difficult for the user, depending upon the weight of the cargo and the height of the vehicle. The prior art pull-out and tilt down rooftop cargo carriers require the user to either significantly limit the weight loading on the cargo platform, or require the user to lift a substantial amount of weight. Also, usually, but not in all cases, in the related pullout and tilt prior art cargo carriers, the only stop or restricting means preventing further downward tilting of the cargo support platform is the lower end of the cargo platform resting on either the ground or abutting the side of the vehicle. With modern, lightweight fuel efficient vehicles, the body panels are thin and easily dented, and thus it is not a good idea to rely on the vehicle body panel or window to restrict the downward movement and angle of the cargo support platform, particularly if there is any significant amount of cargo weight upon the cargo support platform. With prior art cargo carriers which utilize the ground as an abutment surface to prevent further downward tilting of the cargo support platform, my experience is that in order for the cargo support platform to reach the ground, more complicated and expensive structuring allowing telescopic extending and retracting of the cargo support platform or support base or components connected thereto is required, and this is particularly true for vans and most four wheel drive vehicles which include a rather vertically high rooftop.

Another problem in prior art vehicle cargo carriers which include a stationary base and laterally movable and tiltable cargo support platform exists in the complexity of the structuring and the number of parts which increases the costs of manufacturing and ultimately the purchase price by consumers. Typically in the related prior art, many freely rotatable wheels are used in order to attempt to provide for jam-free easy rolling of the cargo support platform on the support base. While the use of wheels in such application can be somewhat effective to some degree, such wheels are costly to purchase, labor intensive to mount, subject to being damaged or having their support axles bent, and require periodic oiling and servicing.

Another problem in vehicle cargo carriers which include a stationary base and laterally movable and tiltable cargo support platform exists in the smoothness or ease at which the laterally movable cargo support platform can be manually slid or rolled upon the support base, as lateral racking (misalignment) of the cargo support platform relative to the support base and the resultant jamming (ceasing to move) is a significant potential problem in the prior art based on what I discovered in building and testing many different cargo carriers. Jamming of the cargo support platform while the user is pushing or pulling it laterally is frustrating in the least, often times requiring hard jerking and pushing and pulling to un-jam the cargo support platform, and resulting in the user having to attempt to apply even pulling or pushing pressure to the cargo support platform in precise areas of the cargo support platform in an attempt to prevent such jamming.

Another common problem in the related prior art is in having one support base fit a variety of vehicle makes and models, as it can be appreciated differing makes and models of vehicles differ in width and shape, and it is desirable to not have to provide a different cargo carrier and support base for each slightly varied vehicle.

An example of a typical prior art rooftop cargo carrier which pulls out and tilts downward is shown in U.S. Pat. No. 3,193,124 issued to R. J. Essling on Jul. 6, 1965. In the Essling patent, it can be seen that the user must lift all of the weight of the cargo support platform plus the weight of the cargo on the platform from a downward tilted angle to a horizontal position in order to then push the cargo support platform horizontally toward the center of the vehicle on the stationary support base. The Essling cargo carrier support platform is quite long, and sufficiently so as to be able to reach downward to the ground absent the use of additional telescopic structuring, and this arrangement not only requires the user to lift the entire weight of the cargo and support platform to horizontal prior to pushing the platform over the center of the vehicle, but it also appears to require that the cargo carrier either be used only on vertically low rooftop vehicles or that it be oriented to be positioned on the vehicle to be drawn outward and off of the back end or back side of the vehicle, and this because vehicles and particularly vans are typically much longer than they are in width, and therefor allow a long and ground contacting cargo support platform when positioned lengthwise parallel to the lengthwise axis of the vehicle.

Another example of a prior art rooftop cargo carrier which pulls out and tilts downward is shown in Netherlands patent 8004228 dated February 1981 and which describes a telescopic tiltable frame which uses abutment with the ground as the tilt-stop for the outwardly drawn and downward tilted cargo support platform. A first portion of the telescopic cargo support frame nearest the ground when tilted is intended to be loaded with cargo and then tilted horizontally followed by being moved over the top of both a second portion of the tiltable frame and a stationary horizontal support frame structure mounted atop of the vehicle, resulting in allowing only the first portion of the tiltable cargo support frame on the downward side of the rotational axis to carry cargo thereon since this first portion telescopically moves over the top of the second portion of the tiltable frame, rendering the second portion of the tiltable frame incapable of carrying cargo.

Another example of a prior art rooftop cargo carrier which pulls out and tilts downward is shown in German patent 3626896 dated 1988 which describes a cargo support trunk mounted laterally slidable and tiltable relative to a stationary support frame mounted atop a vehicle roof. The carrier tubes of the cargo support trunk include telescopic extending supports to extend downward beyond the trunk to rest on the ground to support the adjacent end of the cargo platform and trunk.

Another example of a prior art rooftop cargo carrier which pulls out and tilts downward is shown in U.S. Pat. No. 4,826,387 issued May 2, 1989 to M. Audet. The Audet patent describes a stationary support frame mounted atop a vehicle rooftop which in one embodiment includes two cargo carriers which can be individually drawn outward to oppositely disposed lengthwise sides of the vehicle before hinging downward. The pivot point or hinge center is located at the extreme upper edge of the downward tiltable cargo support platform which requires all of the weight of the cargo laden support platform to be lifted by the user in order to bring the cargo support platform up to a generally horizontal position prior to pushing the cargo support platform laterally back over the stationary frame atop the vehicle.

Other related prior art devices of which I am aware and which are believed to be either cumulative of the above described prior art or related but not teaching or suggesting the present invention but should be considered are described in the following documents: 1) U.S. Pat. No. 4,871,103 issued Oct. 3, 1989 to L. Martinsson for Supporting Arrangement For a Mast on a Vehicle. 2) U.S. Pat. No. 3,460,694 issued Aug. 12, 1969 to J. Simms for Car Top Boat Handling Device. 3) U.S. Pat. No. 3,186,569 issued Jun. 1, 1965 to A. Roux for Boat and Luggage Carrier. 4) U.S. Pat. No. 4,081,095 issued Mar. 28, 1975 to E. Wilburn et al for Vehicle Top Article Carrier. 5) U.S. Pat. No. 2,746,628 issued May 22, 1956 to C. Neyra for Ladder Support. 6) U.S. Pat. No. 4,260,314 issued Apr. 7, 1981 to R. Golze for Roof Top Carrier. 7) U.S. Pat. No. 2,840,290 issued Jun. 24, 1958 to J. Roberts for Telescopic Ladders; 8) French patent 2 673 404 dated 1992 for a vehicle cargo rack. 9) U.S. Pat. No. 5,494,327 of 1996 issued to Derecktor. 10) U.S. Pat. No. 3,384,244 of 1968 issued to Falek. 11) U.S. Pat. No. 3,495,729 of 1970 issued to Kruse. 12) U.S. Pat. No. 2,815,252 of 1957 issued to Baker for plastics strips supporting a drawer, but not anticipating any pivoting or pivot caused or related misalignment and resulting damaging shear forces. 13) U.S. Pat. No. 2,318,971 of 1943 issued to Roumage. 14) U.S. Pat. No. 4,350,471 of 1982 issued to Lehman. 15) U.S. Pat. No. 5,417,358 of 1995 issued to Haselgrove. 16) French Patent 2596344 of October 1987. 17) Patent 2118501A of GB dated November 1983. 18) Patent document 406099776A of Japan; February 1984. European Patent document 101054 dated February 1984.

None of the related prior art devices are structured the same of the present invention, and the present invention offers new benefits and advantages in the field.

SUMMARY OF THE INVENTION

The present invention provides an improved tiltable cargo carrier for mounting above the rooftop and exterior of a motor vehicle, and which allows easy reach of the cargo supporting area, and allows easier tilting of even heavy loads of cargo back into a horizontal storage position after the cargo has been loaded onto a cargo support platform. The present carrier is an improved pull laterally and then tilt-downward type cargo carrier which includes a generally rectangular movable cargo support platform for supporting cargo thereon, and a stationary support base for supporting the cargo support platform. The cargo support platform can be manually pulled laterally from a stored position and then pivoted downward towards the lengthwise side (or back side depending on the mounted orientation) of the vehicle for allowing full access to the entire cargo support platform by an adult person standing upon the ground, and thus easy and safe cargo loading and unloading is provided.

The support base of the present cargo carrier, depending upon the mounting hardware selected, can be attached to an existing stationary prior art cargo carrier with which many motor vehicles are presently equipped, or affixed directly to the vehicle exterior rooftop or rooftop rain gutter thereof, or elongated vertical posts may be used as components of the support base mounting hardware to allow mounting the carrier to the cargo bed or bed-side top edge of a pick-up truck so that the cargo carrier is significantly elevated above the cargo bed or camper shell and at or above the rooftop in a similar manner to many currently in-use lumber and ladder racks on pick-up trucks, which in any mounted arrangement for the purposes of this disclosure the cargo carrier is mounted atop the motor vehicle exterior.

My cargo support platform in a preferred embodiment includes a front member and an oppositely disposed back member which is in spaced relationship and parallel to the front member; the front and back members are normally positioned parallel to the lengthwise sides of the supporting vehicle when in use atop the vehicle. The cargo support platform additionally includes two transverse guide rails in spaced parallel relationship to one another and connected to the oppositely disposed ends of the front and back members and spanning therebetween, so as to define a generally rigid rectangular cargo support platform, the top side of which may be covered with solid sheeting, expanded metal or left generally open and include tie-down hooks and the like. The tiltable cargo support platform can include ski supporting attachments, bicycle supporting attachments, cargo boxes, ladder supporting attachments and other item support or carriers and tie-down gear such as hooks, eyes, clamps and rope attachments and the like for securing cargo atop the cargo support platform.

The transverse guide rails of the cargo support platform are positioned adjacent supporting main rails of the support base, wherein at least one low friction (slick or smooth or both) plastics strip is positioned therebetween to provide lateral guidance aiding in jamb free operation; the strips of bearing material plastic are positioned to extend into or through the pivot area, being adjacent the pivot axis and always between the interfacing rails, so as to maintain alignment of the cargo support platform and guide rails thereof with the adjacent main rails of the supporting base even when the cargo platform is tilted, thereby with this maintained alignment, shear forces which could otherwise damage or tear off the strip or strips of plastics material is reduced or maintained low when the cargo support platform is pivoted in a scissor-like motion from tilted to a position of relatively horizontal atop the support base, as will become further appreciated with continued reading.

The support base mounted on the vehicle includes two parallel, spaced apart main rails which are sized, shaped and positioned (cooperatively shaped and positioned) to mate with the transverse guide rails of the cargo support platform, and at least one plastics bearing strip mentioned above resides between the mating or interfacing rails. The cargo support platform is movably supported on the stationary lower support base attached to the vehicle which allows the cargo support platform to be manually pulled laterally and then tilted from its normal generally horizontally disposed position atop the vehicle into a vertically disposed or inclined position along the side of the vehicle (or back side of the vehicle depending upon the mounted orientation), a position wherein a first portion of the cargo support platform on one side of the rotational axis is closer to the ground than when the cargo support platform was in the horizontal position, and significantly easier to reach from the ground for loading and unloading of cargo. With the present invention, the rotational or pivot axis about which the cargo support platform tilts or rotates is positioned a significant distance away from the upper edge of the cargo support platform when the cargo support platform has been tilted. When in the tilted position, due to this non-edgewardly positioned rotational axis, a second portion of the cargo support platform on the upper side of the rotational axis is slightly raised compared to when the cargo platform is in the horizontal stored position, but is easily reached due to its position nearer the side of the vehicle.

In a preferred embodiment, a tilt-stop arrangement stops the tilting of the cargo support platform at a desired preset or pre-determined point or tilt-angle along the side of the vehicle prior to the lower edge of the platform impacting or abutting the vehicle. The tilt-stop arrangement is preferably user adjustable to allow adjustment or selection of the stop angle of the platform relative to the support base and side of the vehicle, and this allows angular adjustments (platform tilt-angle adjustments) for differently sized and shaped vehicles to provide clearance. The user adjustable tilt-stop also allows the cargo support platform to stop at a given preset user preference for ease in loading and tilting in general, and for user preferred settings (tilts) which may be specific for certain known shapes, sizes and weight distributed cargo which the user may frequently or always carry, such as a ladder for example.

As previously mentioned, with the present invention, the rotational axis about which the cargo support platform tilts or rotates relative to the support base is positioned a significant distance away from the two oppositely disposed widthwise edges of the cargo support platform when the cargo support platform has been tilted, or in other words the pivot point or axle about which tilting occurs is not at either the edge of the cargo support platform, but rather, is somewhat intermediate between the upper and lower widthwise edges of the tilted cargo support platform to allow the intentional loading or placement of cargo above and below the pivot, i.e., vertically or elevationally above and below the pivot point on the top or outward facing surface of the tilted cargo platform, and this so that the weight of the cargo can be placed on the outward facing surface of the cargo support platform and distributed in a manner which reduces the amount of weight the user needs to manually lift in order to tilt the cargo platform back into a generally horizontal position. Additionally, it should be noted that in most applications (but potentially not all applications), the cargo support platform in its tilted position along side of the vehicle is preferably not positioned perfectly vertically straight up and down, but rather, is at a slight tilt, with the upper side or second portion of the cargo support platform angling inward over the top of the near edge of the vehicle. This slight tilt from perfectly vertical is so that the stationary support base does not need to include portions thereof which extend outward too far beyond the side of the vehicle which might snag clothing or hit someone walking by the vehicle in the head, and thus normally and preferably with the present invention the rotational axis of the tilted cargo support platform is at or inward from the side edge of the vehicle. Additionally, in most applications it is simply easier to place and secure cargo on the cargo support platform when the platform is angled or at an incline and not vertically straight up and down. With the present invention, the rotational axis or point of pivot about which the cargo support platform tilts need not necessarily be physically centered on the cargo support platform, and in most applications the rotational axis is preferably off-centered and nearer the upper widthwise edge of the cargo support platform than the lower widthwise edge of the platform and still herein considered intermediate, and this to bring the height of the entire tilted cargo support platform nearer the ground. For example, with taller vehicles such as tall vans and four wheel drives, the pivot point is preferably shifted away from the physical center and additionally from the center of gravity of the cargo platform, being more toward the upper edge of the cargo support platform and reducing the width of the second portion of the cargo support platform relative to the first portion of the cargo platform in order to keep the entire cargo support platform and particularly the upper or second portion thereof vertically nearer the ground and within reach by a person standing on the ground. Additionally, by keeping the rotational axis above the center of gravity of the cargo support platform wherein the lower or first portion of the platform is heavier than the second portion of the platform above the pivot, the tilted cargo support platform will not freely rotate under its own weight from a tilted position back to a horizontally disposed position. Although the further toward the upper edge of the cargo support platform the rotational axis is positioned the less assistance the cargo weight above the pivot can offer in bringing the platform back into a horizontal position, it is not desirable to have the upper or second portion of the tilted cargo platform so high from the ground one cannot secure cargo in this area. Particularly with taller vehicles, and with a "full-width" cargo platform thereon (full-width being almost the width of the vehicle), the pivot point is preferably positioned upward from the physical center of the cargo support platform, being shifted a distance from physical center toward the upper widthwise edge of the platform, but still a significant distance away from the upper edge of the tilted cargo support platform so that tilt-back assistance can be gained from properly placed cargo. This upwardly positioned pivot point brings the entire tilted cargo support platform nearer the ground, making the cargo platform more accessible by a person standing on the ground, when compared to a physically centered pivot point on the same size cargo support platform. Since a significant amount of cargo can be secured to the still fairly wide second portion of the tilted cargo support platform above the pivot point, the cargo support platform can be intentionally loaded in such a manner as to give the user "tilt-assist" even when as little as about 20% of the full usable width of the cargo support platform is on the upper side of the rotational axis, or in other words even when the second portion only constitutes about 20% of the combined widths of the first and second portions of the cargo support platform. The total width of the cargo support platform is defined by the width of the first portion added to the width of the second portion, the first and second portions being on opposite sides of the rotational axis when the platform is in the tilted position, with the first portion being on the lower side of the rotational axis, and the second portion being on the upper side of the rotational axis, with both the first and second portions being useful for carrying cargo thereon, and therefore a significant amount of cargo carrying surface area is provided on which to place cargo. As mentioned above, a "full-width" cargo platform is one which is basically or nearly the full cross width of the vehicle rooftop measured from one lengthwise side to the other lengthwise side of the vehicle, and only one cargo platform is used on a support base as will become appreciated with continued reading.

Another structural arrangement in accordance with a preferred embodiment of the invention allowing easy reach of the upper portion of the tilted cargo support platform and providing tilt-assist, is a "half-width" cargo platform, as opposed to "full-width" cargo platform. A half-width cargo platform is a relatively narrow platform measuring the cargo support platform from the front edge adjacent the side of the vehicle toward the center of the vehicle with the platform horizontally disposed. Normally, a half-width cargo support platform is less than half the cross width of the vehicle rooftop. As will be become appreciated, this "half-width" cargo support platform arrangement can be structured wherein two "half-width" cargo support platforms are used on a single stationary support base, with a first half-width cargo support platform moveable to one lengthwise side of the vehicle, and a second half-width cargo support platform movable to the oppositely disposed lengthwise side of the vehicle, and thereby easy reach to all areas of each cargo support platform is maintained. Additionally with this arrangement, the first and second half-width cargo support platforms still include a non-edgewardly positioned pivot point (rotational axis) and are thus tilt-assisted back into the horizontal position by properly positioned and secured cargo thereon, and a large overall cargo carrying surface area is still provided when one considers the total combined storage area of both the first and second half-width cargo support platforms on a single vehicle. The half-width cargo support platforms are most desireable on vehicles having vertically high rooftops such as vans, although the structure can be used on lower vehicles, and the full-width cargo platforms are useful on vertically low vehicles but can be used on vertically tall vehicles in some applications.

Another aspect of a preferred embodiment of the present invention is a generally smooth and jam free movement of the cargo support platform in both tilting and sliding movements relative to the support base even when the cargo support platform is carrying substantial weight, with this smooth, jam free movement provided by low friction (slick) vertical load supporting plastic strips serving as interfacing bearing surfaces between the cargo support platform and the support base, and also with lateral guidance plastic bearing strips (as mentioned above) extending into the area of the pivots to maintain lateral alignment between the platform and support base even when the cargo support platform is tilted, thereby reducing shear force when moved to an un-tilted position, the lateral guidance strips also providing lateral and anti-rack guidance during pushing or pulling the cargo support platform when horizontally disposed on the support base.

Another desireable aspect of a preferred embodiment of the present invention is that it can be built with relatively few and uncomplicated parts, and of readily available materials, and therefore it can be manufactured and sold for a relatively low price.

Another desirable aspect of a preferred embodiment of the present invention is that it is not restricted to a particular orientation on the vehicle. The cargo carrier can be positioned so that the cargo support platform draws off one side, both sides with half-width platforms, or the back side of the vehicle.

These, as well as other objects and advantages will become increasingly appreciated with continued reading and with a review of the attached drawings showing preferred embodiments in accordance with the present invention.

BRIEF DESCRIPTION OF THE DRAWINGS

FIG. 3 shows a side view of one of two main rails of a support base suitable for supporting the cargo support platform in accordance with the present invention for example. The shown main rail of the support base is structured for use with two half-width cargo support platforms.

FIG. 4 shows a top view of the main rail of FIG. 3 of the support base.

BEST MODES FOR CARRYING OUT THE INVENTION

Figure 1:
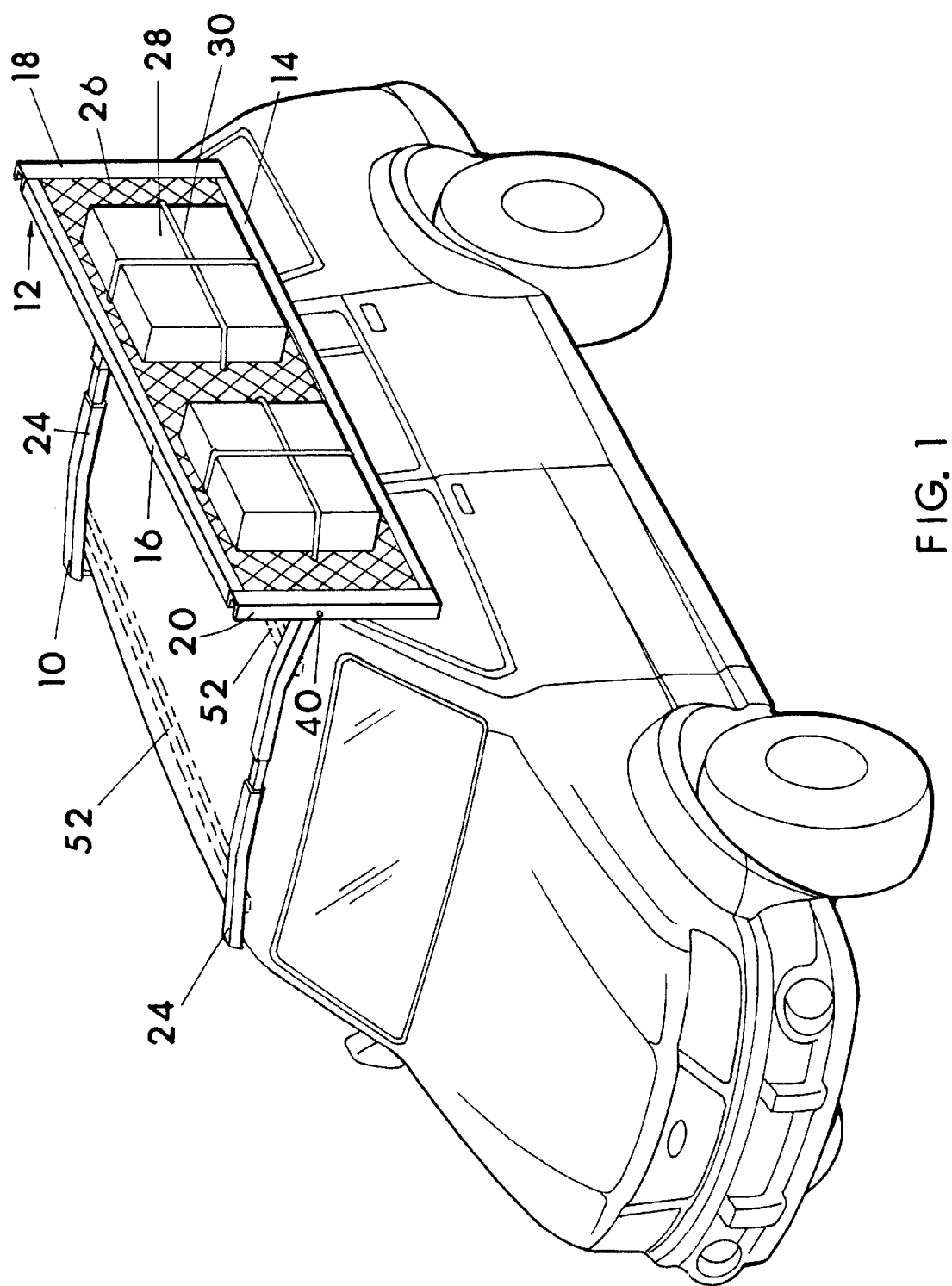
FIG. 1 shows a motor vehicle equipped with a cargo carrier in accordance with the invention. The cargo support platform is shown in the tilted position drawn to one lengthwise side of the vehicle with cargo attached thereto and secured in place with elastic cords to an expanded metal top surface of the cargo support platform shown for example. The shown cargo support platform is considered a full-width platform, and it should be evident the support base and cargo support platform could if desired, and in a shortened version, be re-oriented on the vehicle so that the cargo support platform draws to and tilts off of the back side of the vehicle.

Referring now to the drawings in general for a detailed description of preferred structural embodiments and best modes for carrying out the invention in accordance with the present invention and given for example. There are basically two major components in a preferred structural embodiment, with the first major component being the support base 10 mounted or mountable stationary on the top exterior of a motor vehicle, and the second major component being the movable cargo support platform 12. The cargo support platform 12 is supported bi-directionally laterally moveable and bi-directionally tiltably movable on and by the support base 10. The movements in the preferred embodiments of the cargo support platform 12 relative to the support base 10 are manually powered to eliminate costly motors, or cranks, cables and pulleys, or in other words the platform 12 is gripped by hand and either pulled or pushed laterally, and tilted downward or back to horizontal by the human user.

Figure 2:
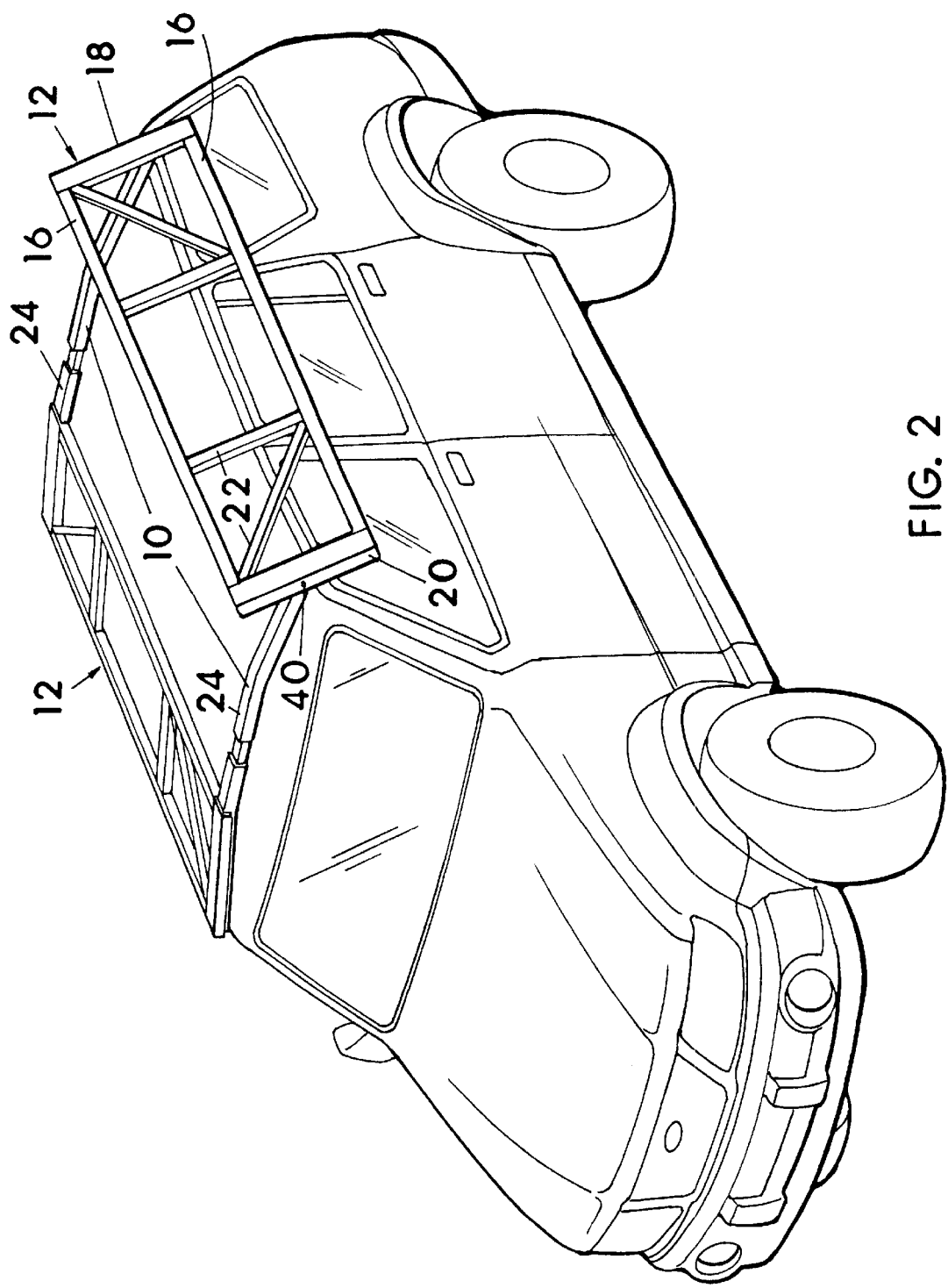
FIG. 2 shows a motor vehicle equipped with a cargo carrier in accordance with the invention, and includes two half-width cargo support platforms with one platform horizontally disposed and the other platform in the tilted position at the lengthwise side of the vehicle.

Since the tops of vehicles are generally rectangular, and to more efficiently utilize space, the preferred overall shape of cargo support platform 12 is rectangular as may best be ascertained from the applicable drawings. Cargo support platform 12 generally comprises a rigid and strong thin rectangular frame generally defined by rigid members connected together to define the rectangular frame, and in the example shown including front member 14 primarily made for example of 90 degree angle metal (angle iron), back member 16 made for example of 90 degree angle metal (angle iron) in spaced and parallel relationship to front member 14, a right end transverse guide rail 18 perpendicular to the front and back members 14, 16, and left end transverse guide rail 20 perpendicular to the front and back members 14, 16 and parallel and in spaced relationship to the right end transverse guide rail 18. Guide rails 18 and 20 may herein be referred to as first and second rails or first and second guide rails of cargo support platform 12. The right guide rail 18 is connected at its two oppositely disposed ends to the front and back members 14, 16, and the left guide rail 20 is connected at its oppositely disposed ends to the front and back member 14, 16 so that a rigid rectangular frame is defined. Additional cross and angled braces 22 may be applied to further rigidify the rectangular frame if desired. Cargo support platform 12 may be made of steel members welded or bolted together, although other materials such as aluminum or plastics or composites could be utilized within the scope of the invention. In the example shown and described herein, right and left guide rails 18, 20 are both made of channel shaped material such as channel iron with the open side of the channel facing downward and straddling the main rails 24 of support base 10 when the cargo support platform 12 is in the horizontally disposed position as may be ascertained from FIG. 9. FIGS. 1 and 2 show support base 10 with two spaced and parallel main rails 24 which may herein be referred to as first and second rails or main rails of support base 10.

The top or upper surface of cargo support platform 12 is generally flat to provide a generally flat surface upon which to rest cargo, although cargo carrying boxes or vertical dividers can be applied to the top surface of cargo support platform 12. The top surface of the cargo support platform 12 may include a solid flat panel such as a rectangular plate of metal, plywood, plastics or expanded metal 26 affixed to the frame so that the top surface is a solid flat top surface. Cargo boxes for placing cargo therein, hooks, clamps and the like can be attached such as by welding or bolting to the cargo support platform to allow the securing of cargo onto the platform 12. FIG. 1 shows boxes of cargo 28 secured to an expanded metal 26 top surface of cargo support platform 12 with the use of elastic cords 30 having hooks hooked underneath the expanded metal and used to secured the boxes of cargo stationary.

Figure 8:
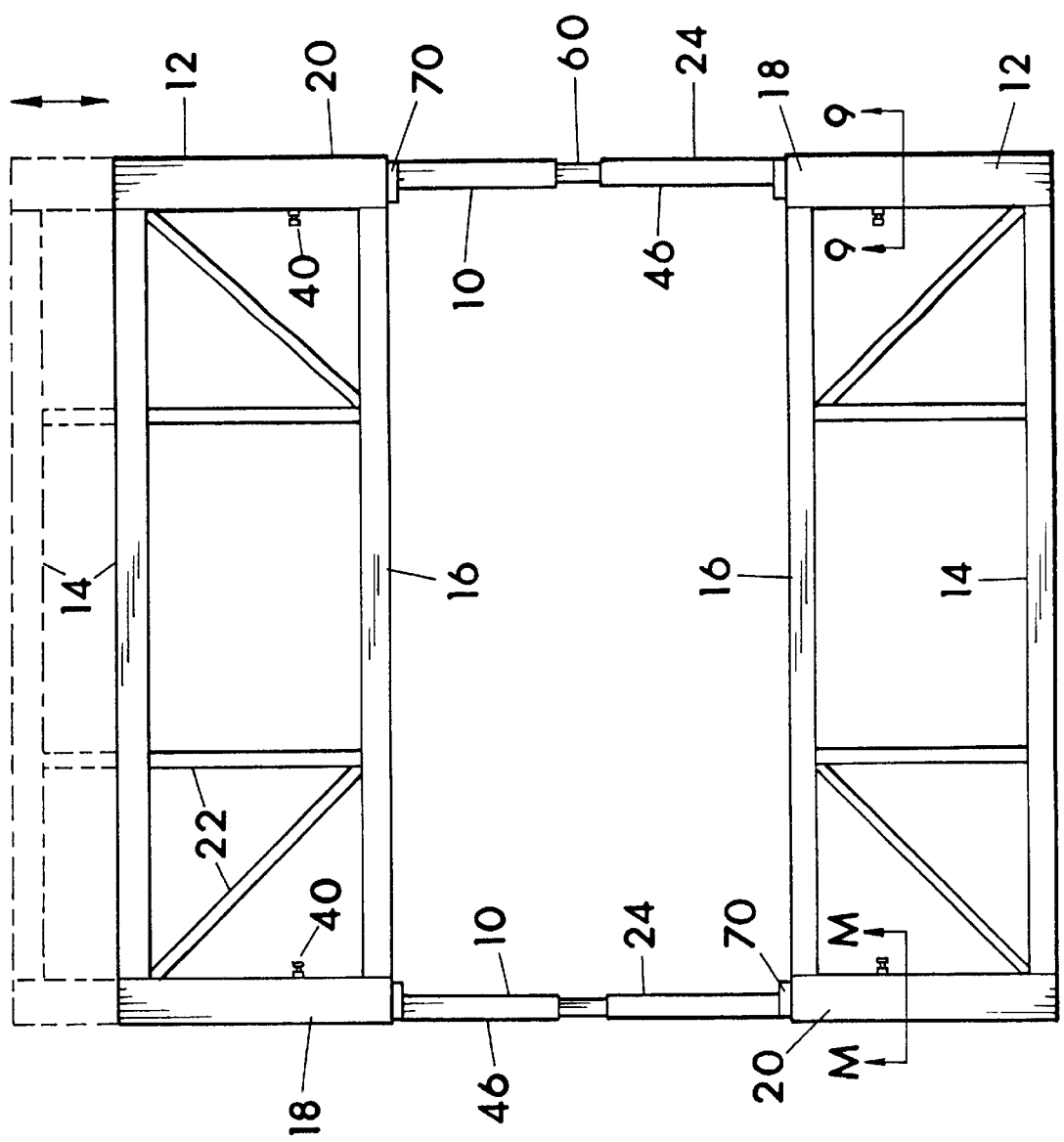
FIG. 8 is a top elevational view of two half-width cargo support platforms engaged with the lower support base in accordance with the present invention for example. Broken lines on one side of the drawing indicate one cargo support platform partly drawn outward laterally on the support base.
Figure 9:
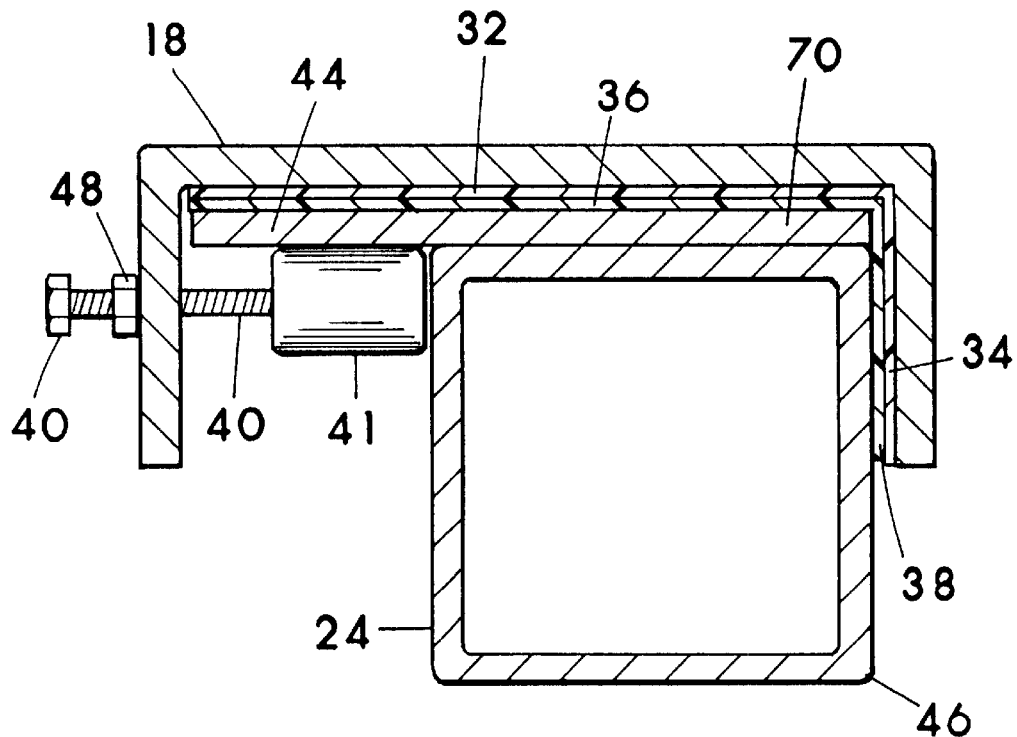
FIG. 9 is a cross sectional view taken at line 9—9 of FIG. 8.

A sectional cut through line M—M of FIG. 8 would appear as a mirror image of FIG. 9. As may become better appreciated from FIG. 9, the underside of both the right and left guide rails 18, 20 (channel iron) include plastic strips 32, 34 secured in place such as with glue (tongue and groove fits or recessed headed bolts or other suitable securements can be used to mount plastic strips) so as to meet with correspondingly placed mating plastics strips 36, 38 or metal of support base 10 as will be further detailed. A side strip 34 of plastics material is located and adhered such as with glue on one interior downwardly depending side of each guide rail 18, 20, on the downward depending side of the channel opposite (proximal and in the pivot axis in the example shown) the side supporting pivot stud 40 as can be ascertained from FIG. 9. Additionally a strip 32 of plastics is secured such as with glue to the top or middle horizontally disposed underside bottom between the two downward depending side of the channel of each guide rail 18, 20 so as to meet with correspondingly placed mating plastics strips of support base 10, or directly with the upper or interfacing surface of member 70 as will be detailed. Guide rails 18 and 20 of cargo support platform 12 when in the generally horizontally disposed position atop support base 10 should be separated from the interfacing main rails 24 by a strip 32 or a strip 36 or both strips 32 and 36 for vertical load carrying wherein it can be a plastic strip to plastics strip bearing arrangement, or a plastics strip to the metal or whatever material the interfacing rail not carrying the plastics strip is made of. Sometimes just one strip of plastics produces less friction when slid against a hard surface such as metal than when two strips of plastics are slid against one another as in the FIG. 9 arrangement, and this is true with the present invention for both vertical and lateral load carrying or guidance plastics strips. Top strips 32 and side strips 34 can be approximately the same length as the supporting guide rails 18, 20 so as to be positioned and extending on each opposite side of pivot studs 40. In the example shown, the length of each of the guide rails 18, 20 is basically equal to the width of the cargo support platform 12, extending from one widthwise edge to the other oppositely disposed widthwise edge of the platform 12, with the pivot studs 40 which form a major portion of the pivot axle arrangement (pivot axle means) being mounted to the guide rails 18, 20 and intermediately or non-edgewardly positioned between the widthwise edges of the cargo support platform 12. As will become appreciated with continued reading, the other major portion of the pivot axle arrangement (pivot axle means) is the stop-holder 42 on the ends of the main rails 24 of the support base 10.

As can be ascertained from FIGS. 8 and 9, each guide rail 18, 20 includes an affixed pivot stud 40 mounted to the rail to extend in parallel alignment to the wide horizontal middle surface of the channel iron of the guide rails. A cargo support platform 12 includes a pair of pivot studs 40 with each stud 40 mounted to an oppositely disposed end of the platform 12. The pivot stud 40 of each guide rail 18, 20 is mounted in the downward depending side edge of the channel iron, the downward side edge oppositely disposed from the side edge supporting the side strip 34 of plastics material. In the example shown, pivot stud 40 is a rigid and strong hex-head threaded bolt such as a steel bolt inserted through a threaded hole in the side edge of the guide rail with the head of the bolt on the exterior of the channel side edge and the threaded shank of the bolt aiming inward and basically straight toward the opposite side edge supporting the side plastic strip 34. The shank of the bolt of pivot stud 40 is positioned downward from the underside or adjacent surface of an overhanging flange 44 of support base 10 as may be seen in FIG. 9 and as will be further detailed. The end of pivot stud 40 underneath flange 44 can be covered with a rubbery or plastic cap 41 to help reduce noisy rattling when the vehicle is driven over bumps, but otherwise should be maintained near or loosely against the underside surface of flange 44, as this will prevent tipping of the cargo support platform 12 on support base 10 prior to the cargo support platform 12 being drawn outward to the ends of the main rails 24 of support base 10. The bolt defining the pivot stud 40 in the example given is threadably engaged with the side edge of the channel defining the guide rail, and thus can be rotated to place more or less of the bolt shank underneath flange 44. As will become appreciated with continued reading, the distance between the terminal end of the pivot stud 40 (or its plastic covered end 41) and the side plastic strip 34 of the guide rails 18, 20 is about or just slightly less than the width of the main tubes 46 of the main rails 24 of the support base 10, and this so that a main tube 46 of main rail 24 will fit snugly into this space. Pivot stud 40 when defined by a bolt as above described should have a nut. 48 applied to its threaded shank which can be tightened against the outside surface of the guide rail after pivot stud 40 has been properly adjusted in order to prevent pivot stud 40 from vibrating out of adjustment.

Cargo support platform 12 includes two pivot studs 40, one on each end thereof, and placed inward away from both of the widthwise edges of cargo support platform 12 as may be seen in FIG. 8. Of the pair of pivot studs 40, one aims one way, and the other aims the opposite direction in the example shown, as do the outward extending flanges 44 of support base 10 as will be further detailed. As previously mentioned, with the present invention, the rotational axis about which the cargo support platform 12 tilts or rotates relative to the support base 10 is positioned a significant distance away from the widthwise edges of cargo support platform 12 when the cargo support platform has been tilted, or in other words the pivot studs 40 which serve as axles about which tilting occurs are not at the edge of the cargo support platform, but rather, are somewhat intermediate between the upper and lower widthwise edges of the tilted cargo support platform to allow the intentional loading or placement of cargo above and below the pivot, i.e., vertically or elevationally above and below the pivot point on the top or outward facing surface of the tilted cargo platform, and this so that the weight of the cargo can be placed on the outward facing surface of the cargo support platform and distributed in a manner which reduces the amount of weight the user needs to manually lift in order to tilt the cargo platform back into a generally horizontal position. In FIG. 1 on the tilted platform, the boxes of cargo 28 are shown in part on each side of the pivot studs 40, and if a human user were to grasp the lower edge of the cargo support platform to tilt the platform back into horizontal in preparation of pushing the platform 12 inward over the support base 10 in preparation of driving the vehicle, due to the positioning of the boxes of cargo and the weight thereof on each side of the rotational axis of the platform, the human user would find it significantly easier to tilt the platform back to horizontal because of the weight of the cargo on the upper side of the rotational axis.

Cargo support platform 12 can be intentionally loaded in such a manner as to give the user "tilt-assist" even when as little as about 20% of the full usable width of cargo support platform 12 is on the upper side (second portion of the platform surface) of the rotational axis, or in other words even when the second portion only constitutes about 20% of the combined widths of the first and second portions of the cargo support platform 12. The total width of the cargo support platform is defined by the width of the first portion added to the width of the second portion, the first and second portions being on opposite sides of the rotational axis when the platform 12 is in the tilted position, with the first portion being on the lower side of the rotational axis, and the second portion being on the upper side of the rotational axis, with both the first and second portions being useful for carrying cargo thereon. The width of the second portion of the cargo support platform 12 is basically the distance from pivot stud 40 out to the edge or lengthwise edge of platform 12 nearest the center of the vehicle when the platform 12 is horizontally disposed. The width of the first portion of the cargo support platform 12 is basically the distance from pivot stud 40 out to the edge or lengthwise edge of platform 12 nearest the side edge of the vehicle when the platform 12 is horizontally disposed.

Figure 11:
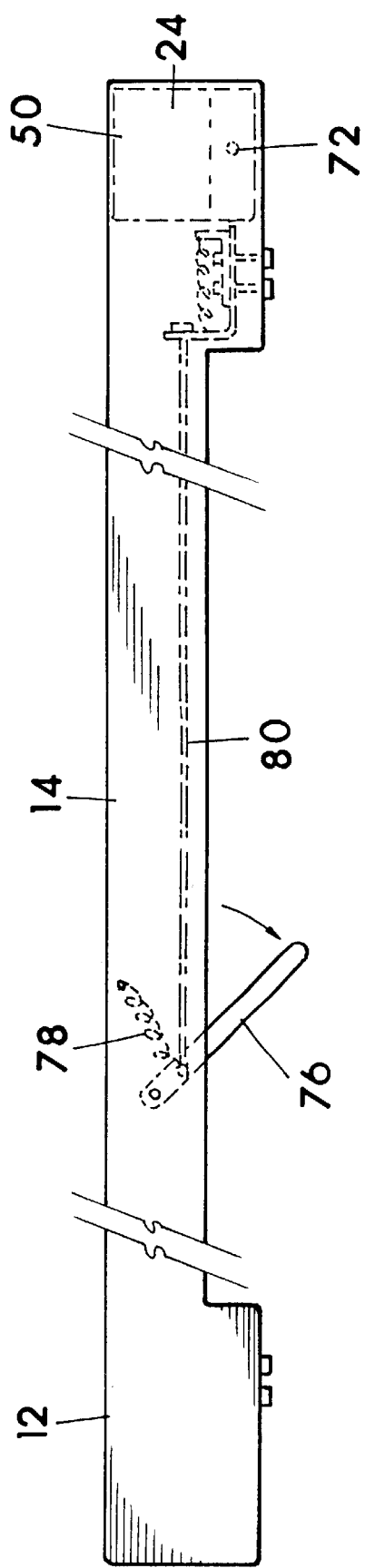
FIG. 11 shows a front edge view of a cargo support platform front member in accordance with the present invention for example, and showing portions of latching components, portions of which are indicated in broken lines.

As may be ascertained from FIG. 11, the front member 14 of cargo support platform is positioned to close the adjacent otherwise open ends of the channel iron of guide rails 18, 20, and this to provide not only a finished appearance, but also an abutment surface against the ends 50 of the main rails 24 of support base 10 when pushing the cargo support platform inward over the vehicle so as to stop further inward movement of the platform 12 relative to the support base 10. The opposite end of each guide rail 18, 20 adjacent back member 16 is left open or unobstructed between the two spaced apart downward depending sides of the channel iron defining the guide rails so that the guide rails (channel) can rest on main rails 24 with the main rails between the channel side walls as may be ascertained from FIG. 9.

Support base 10 generally comprises two (a pair) elongate main rails 24 which in drawing FIGS. 1–6, include elongate rectangular main tubes 46 which are mounted to the vehicle in parallel spaced relationship to one another, as are main rails 24. Main rails 24 are positioned one at each approximate lengthwise end of the cargo support platform 12 directly underneath guide rails 18, 20, and since the cargo support platform 12 is normally longer than it is wide, the main rails 24 are normally positioned perpendicular to the length of the cargo support platform 12 as may be seen in FIGS. 1 and 2. In FIGS. 1 and 2 the main rails 24 are mounted perpendicular to the lengthwise axis of the vehicle, but main rails 24 can be mounted extending lengthwise parallel to the length of the vehicle if it is desirable to draw the cargo support platform 12 off of the back side of the vehicle. Henceforth, the support base 10 will be described as though main rails 24 are mounted in orientation relative to the vehicle to allow the cargo support platform(s) 12 to be drawn off of the lengthwise side(s) of the vehicle as shown in FIGS. 1 and 2.

Rigid cross-bracings as indicated with broken lines at 52 in FIG. 1 can be connected between a pair of main rails 24 if necessary to maintain the rails parallel to one to one another, and if used the cross-bracings need to be connected such as to the bottom of the main rails so as to not interfere with sliding of cargo support platform 12.

Tubes 46 of main rails 24 may, if desired, be bent or angled such as shown for example in FIGS. 1–3 so as to more closely conform to a curved or domed vehicle rooftop shape and to maintain the cargo support platform 12 and the ends 50 of the support base 10 at which the platform 12 tilts as near to the ground as possible, and although this positions the cargo support platform 12 at a slight tilt or slope when resting in the stored position as indicated in FIG. 3, for this disclosure this slightly tilted but in the resting position of cargo support platform 12 laying generally flat on the support base 10 and generally horizontally is considered horizontal or horizontally disposed. The tubes 46 of main rails 24 can be straight and absent bends if desired.

As will be detailed below, each main rail 24 generally comprises the elongated main tube 46; mounting feet or other suitable mounting hardware for attaching the tube 46 to a vehicle; an outward extending flange 44 for overhanging a pivot stud 40 of the cargo support platform 12; a stop-holder 42 comprising a vertical surface 54 and an adjacent horizontal surface 56 against which the pivot stud 40 abuts and rests upon during tilting of the cargo support platform 12; strips of slick plastics material 36, 38 on the top and on one side thereof and extending from the endward area 50 of main tube 46 so as to extend to the side of stop-holder 42 (and pivot studs 40) and inward along tube 46 as can be ascertained from FIG. 7 for engagement against mating strips 32, 34 of plastics on the cargo support platform 12 for providing low friction bearing surfaces (single plastic strips can be used as will be detailed); a tilt-angle stop surface 58 or 72 for abutment against the back underside (bottom) of cargo support platform 12 (the back underside being cover by plastic strip 32 in the example shown); and preferably the main tubes 46 are length adjustable and include telescopic center tubes 60 and set-screws 62 or the like locking mechanics for locking the main tubes 46 (main rails) at a fixed length once initially adjusted for installation on a particular vehicle.

Figure 5:
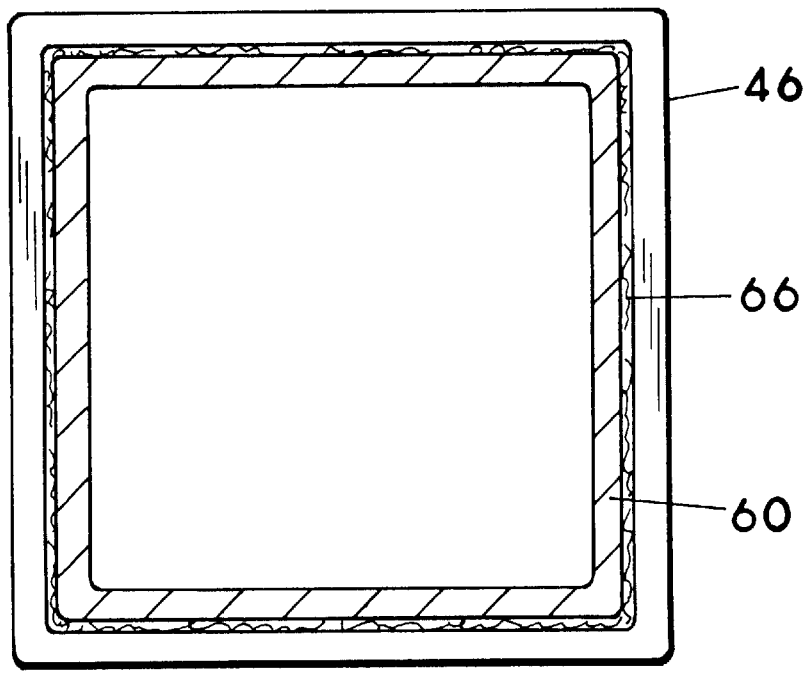
FIG. 5 shows a cross sectional view taken at line 5—5 of FIG. 3.
Figure 6:
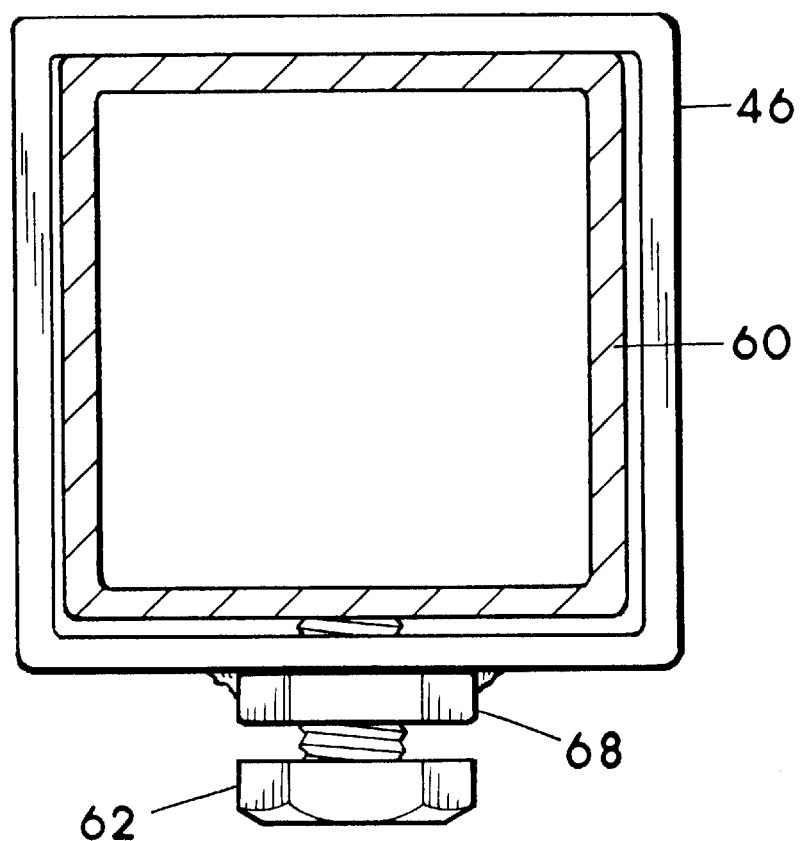
FIG. 6 shows a cross sectional view taken at line 6—6 of FIG. 3.
Figure 13:
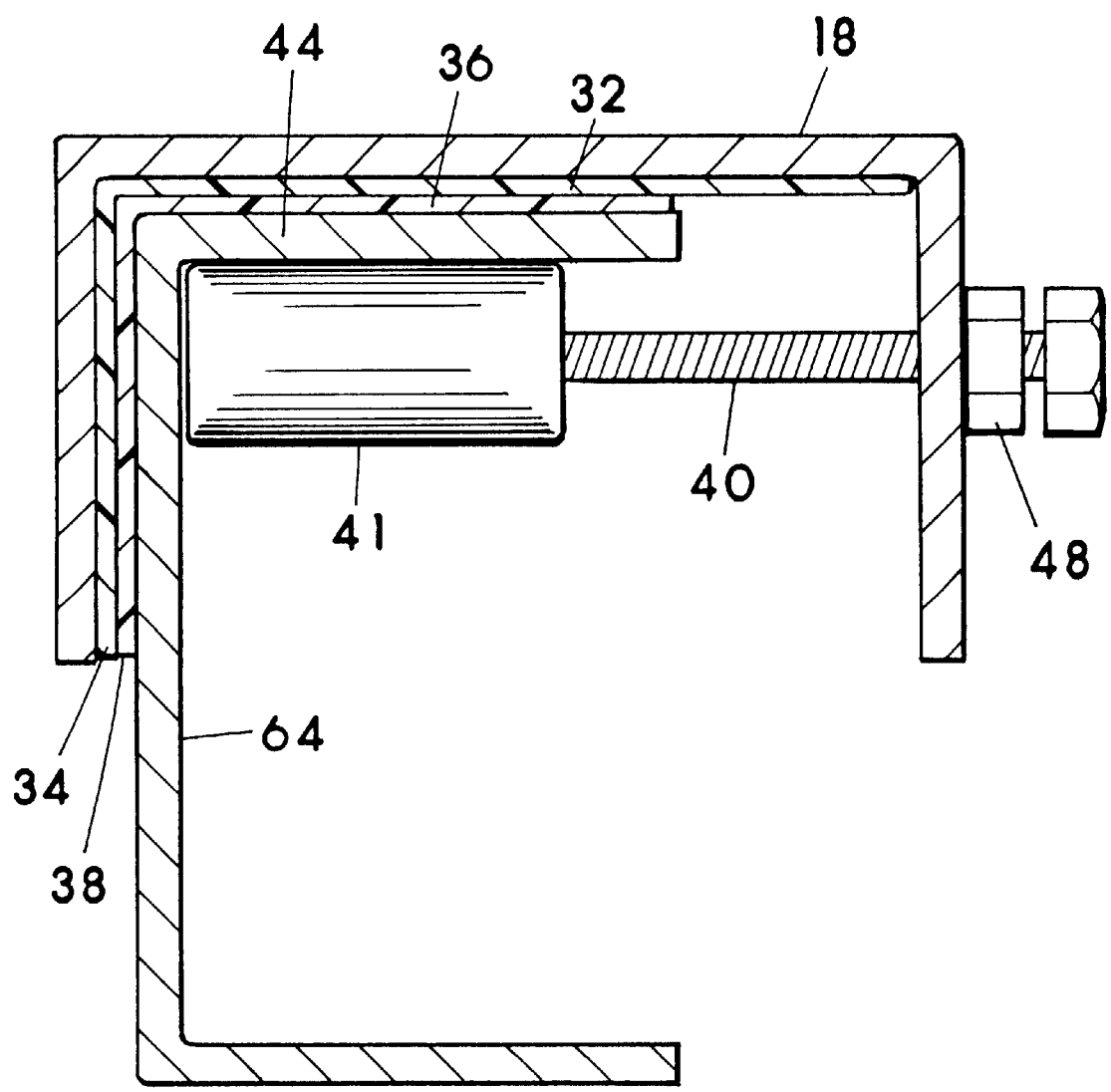
FIG. 13 is an illustration showing that channel iron or channel shaped material can be used instead of the square tubing shown in FIG. 9 as the main member of the main rail of the support base.

Main tubes 46 are made of strong and rigid material such as steel or aluminum, although other rigid materials such as rigid plastics or composite material could be used within the scope of the invention, and the tubes do not have to be hollow, but could be solid material, although weight and cost should be considered. I have successfully used thin-walled rectangular steel tubing to define tubes 46. As indicated in FIG. 13, tubes 46 can be replaced or made with channel material 64 such as channel iron or even angle iron instead of the rectangular tubing. Two identical main rails 24 are normally used on a vehicle to support one full-width or two half-width cargo support platforms 12 as may be ascertained from FIGS. 1 and 2, and the two identical main rails 24 are positioned to be the reverse of one another, i.e., with the flanges 44 thereof aiming or extending in opposite directions (toward one another). The use of only one half-width cargo support platform instead of two platforms on a single support platform 12 is certainly within the scope of the invention. As can be ascertained from FIGS. 3–6, each main tube 46 is cut centrally and includes a smaller rectangular tube 60 inserted into one open end and welded in place at weld bead 66 as shown in FIG. 5, with the other end of the tube 60 inserted into the other open end of the cut main tube 46 and releasably secured in place with a set-screw 62. Two set-screws 62 are shown in the drawing. The loosening of the set-screw 62 allows the lengthening or shortening of the overall main rail 24 length when the small tube 60 is slid further or less into the tube 46. A nut 68 can be welded over a drilled hole in tube 46 if the tube is particularly thin-walled to provide increased thread length and strength for holding the set-screw 62 in tubing 46 as may be ascertained from FIG. 6. The length adjustability of main rails 24 allows the rails 24 and thus support base 10 to be installed on a variety of differently sized and shaped vehicles, and to allow the ends 50 thereof to be aligned so that pivot studs 40 of the cargo support platform 12 both arrive at the stop-holders 42 on the ends 50 at the same time when the cargo support platform 12 is pulled outward laterally of support base 10 in preparation of tilting the cargo support platform.

Figure 7:
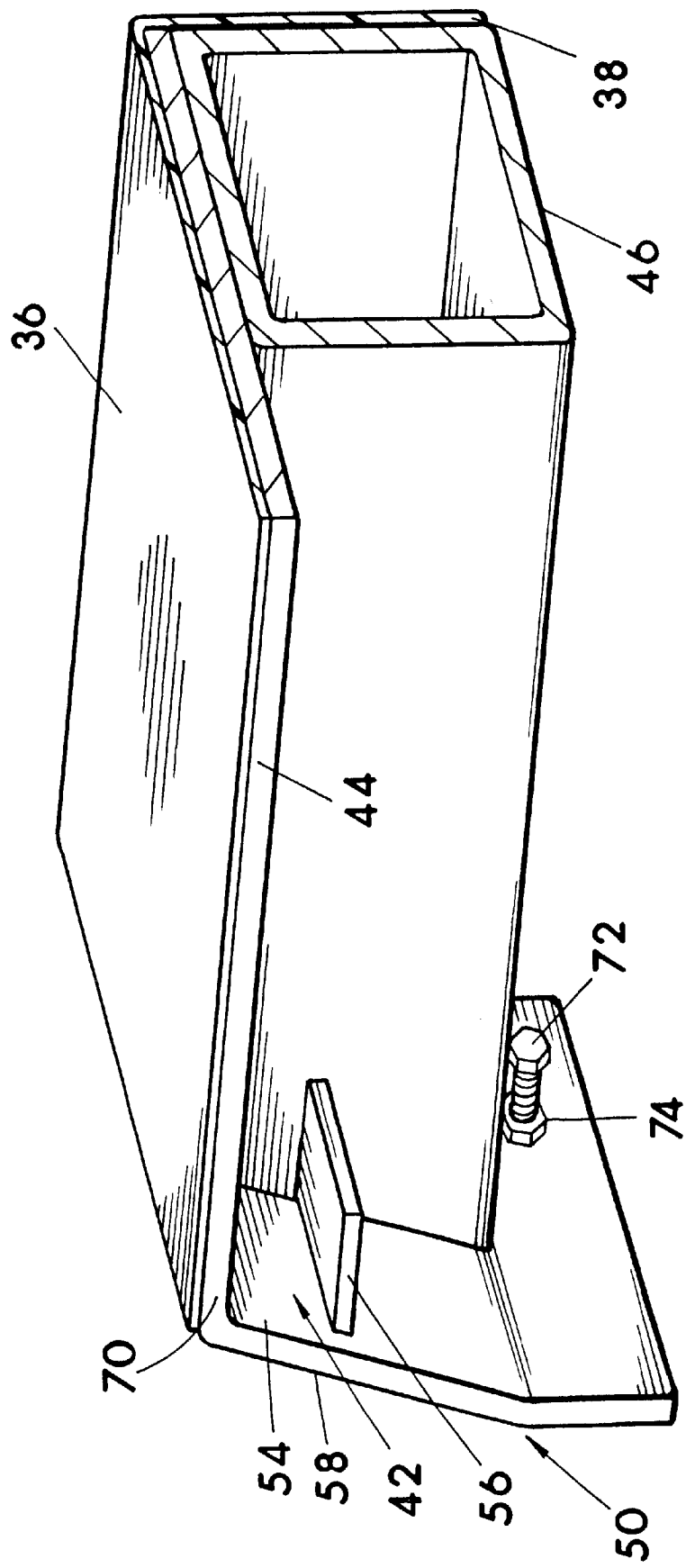
FIG. 7 shows a cross sectional view taken at line 7—7 of FIG. 3, with the view rotated so as to be a side perspective to more clearly show certain details.

As may be seen in FIGS. 3, 4 and 7, affixed such as by welding or bolting atop each main tube 46, or possibly integrally form therewith, is a plate 70 which provides a wide top surface on which a slick plastics strip 36 is adhered such as by glue, recessed headed screws/bolts or other suitable securements, and plate 70 extends outward beyond the width (one side edge) of tube 46 to provide flange 44 which overhangs the pivot stud 40 of the cargo support platform 12. As may be seen best in FIGS. 4 and 7, plate 70 is positioned with one edge flush with the side edge of tube 46, and the other side or edge of plate 70 extends outward beyond the other side of tube 46 a half-inch or so (example only) to define the flange 44. Plate 70 is of rigid and strong material, such as steel for example, but could be other materials such as aluminum. Plate 70 extends along the top length of tube 46 about the width of the cargo support platform 12 intended to be used on the support base 10, or about the length of guide rails 18, 20 of cargo support platform 12. As can be seen in FIG. 3 and 7, plate 70 is bent or otherwise shaped in the area of its outward or terminal end correlating with the end of main rail 24.

Each main rail 24 includes two oppositely disposed ends 50 basically correlating with the end of tubes 46. If the end 50 of the main rail 24 is to serve as an end at which a cargo support platform 12 pivots, then that end is structured in a particular manner, generally as shown FIG. 7 to include stop-holder 42 structure comprising a vertical surface 54 and an adjacent horizontal surface 56 for abutment against and then resting on by pivot stud 40. Stop-holders 42 are positioned underneath the flanges 44 as may be ascertained from FIG. 7. It should be noted that the plastic side strips 34 of the cargo support platform 12 and the plastic side strips 38 of tubes 46 of the support base 10 are in interfacing juxtaposition with one another straight across from the pivot axle (pivotal axis) even when the cargo support platform is in the fully tilted position. This maintained overlapping or interfacing juxtaposition (constant contact depending upon applied tolerances) of the side plastics strips 34 and 38 when the cargo platform is fully tilted provides a portion of the strips (or at least one strip when only one strip of plastics is used per side end or pair of mating rails, which is most economical and most preferred at this writing,) between the adjacent rails of the support base 10 and cargo platform 12 while the majority of the length of the side strips 34, 38 are not juxtaposed due to the tilted or pivoted-up position of the cargo support platform 12 relative to support base 10. This positioning of at least a portion of the plastics strips (or at least one strip if only one is used per side) always between the two adjacent side edges of a mating pair of rails at the pivot axis provides or helps to provide a maintained alignment of the plastics strips with one another and with the rail side edges, which I have found to be important for reducing shear or shearing forces against the strips (or strip) when cargo support platform 12 is tilted back from a tilted position to a horizontal position on support base 10. The maintaining of at least a portion of the side plastic strips 34 and 38 adjacent the pivot axles with cargo support platform 12 fully tilted serves to maintain the strips aligned with each other, the maintained alignment serving to guide and align further increasing juxtaposing of the plastics strips 34 and 38 as cargo support platform 12 is pivoted on the pivot axles from a tilted position and moved to a horizontally disposed position atop support base 10. The tilting of the cargo support platform 12 back onto the support base 10 causes a scissor-like passing of the adjacent and interfacing side edges of the rails of the cargo platform 12 and support base 10, and of the plastics side strips 34 downward across the outer faces of strips 38, (or if only one'strip of plastics is used as a guide/bearing per a pair of rails then the plastics is moved or swept across the side face of the interfacing rail) the sweeping across occurring first nearest the pivot point and moving outward from there as the cargo support platform 12 is moved in a scissoring action relative to the support base 10. By maintaining the plastic strips adjacent the pivot axle or axis even when the cargo support platform 12 is fully tilted out of horizontal, the alignment required to allow strips 34 to slide in a scissor like motion across the outer faces of strips 38 as the cargo platform is pivoted back to horizontal can be maintained to a degree necessary to eliminate the gross misalignment of the strips 34 with the strips 38 which could otherwise cause the strips 34 to catch the top narrow edge of the strips 38 and to hang-up, or become damaged, or tear-off the plastic strips. If only a single side strip of plastics, either strip 34 or 38 is used on each opposite side of the cargo carrier for providing a lateral low friction surface between the two adjacent rails of the support base 10 and cargo platform 12, the plastics strip affixed to either the base 10 or cargo platform 12, which is quite feasible and within the scope of the invention and slightly less expensive, then the plastics strips 34 or 38, and either can be used, should also extend into the area of the pivot axle or axis, i.e., have a portion of the strip extend into the proximal area where the axis of axle studs 40 rotate in stop-holder 42 so that at least a portion of the plastics side strips (one side strip on each end of the cargo carrier) are always between the adjacent interfacing sides of the interfacing rails of the support base 10 and cargo platform 12 at the pivot point in order to maintain alignment to eliminate or reduce shearing forces thereagainst when the cargo platform is moved from a tilted position to a horizontal position, much like when two plastics strips 34 and 38 are used on each side and facing one another as above detailed. Gross misalignment is prevented by having a portion of the plastics side strip(s) in the pivot area, as detailed above, and assuming excessive tolerances (spacings) are not provided between the adjacent surfaces of tube 46 and rail 18 of the base 10 and cargo platform 12 respectively, whether two interfacing bearing plastics strips are used per each side or just one plastics strip per each side end so as to have plastics to metal bearing surfaces. If just one plastic strip 34 or 38 is used per each side edge of the carrier in the otherwise generally identical structured cargo carrier as herein detailed, then the space between the adjacent interfacing side surfaces of tube 46 and rail 18 is preferably approximately the thickness of the plastics strip 34 or 38 assuming the strip is surface mounted, and the strip 34 or 38 interfaces with and at times contacts the metal (or whatever the material) of the tube 46 or rail 18 which the plastics strip 34 or 38 is not attached, a situation which I have found to produce satisfactory and economical results in reducing friction and providing for jam free sliding of the cargo platform 12 on the support base 10, and maintained lateral alignment and thus low shear force on the lateral plastic strips during tilt-back to horizontal. Through or via this structural arrangement of having the side or lateral strips of plastics always being at least in part positioned between the interfacing rails, particularly when the cargo support platform is tilted, provides an arrangement wherein the strip is always at least in part "started" for the sweeping across the face of the opposing member when the cargo support platform is tilted back toward horizontal, thereby an abrupt edge of the plastics strip does not have to start or move outward of the opposing face in a sliding arc movement over either a mating strip of plastics or the hard material of the opposing rail, the abrupt edge if present could easily be a location of "hang-up" and high shear forces being applied to damage the strip or tear it from location.

When two half-width cargo support platforms are used on a single support base 10, one tilts on one side of the support base, and the other cargo support platform 12 tilts on the other side of the support base 10, and the support base includes two main rails 24 which means there are four main rail ends 50 or a pair of ends 50 for each half-width cargo support platform 12, and these four ends will all be basically structured identically to one another and basically as shown in FIG. 7. When one full-width cargo support platform is used on a support base 10, the support base includes two main rails 24 which means there are four main rail ends 50, but two ends 50 on one side of the vehicle will not be ends which cargo support platform 12 tilts over since a full width cargo support platform will normally only draw outward and tilt on one side of the support base 10 and vehicle. With a full width cargo support platform, two ends 50 of support base 10 on one side of the vehicle at which the cargo support platform does not tilt about may be cut square or cut and capped and considered finished without the need for a stop-holder 42 or a tilt-stop surface 58, but the other two ends 50 (a pair of ends) adjacent one side of the vehicle are ends which the full-width cargo support platform tilts over, and so these ends will each be structured to include a stop-holder 42, a tilt-stop surface 58 or 72, and the overhanging flange 44 basically shown in FIG. 7. At an end 50 of support base 10 at which pivoting occurs, plate 70 turns downward extending across the cut end of tube 46 to close the tube, and extends an inch or so below tube 46, and basically defining a generally vertically oriented flange continuation of flange 44 as shown in FIG. 7. The backside of plate 70 underneath flange 44 is the vertical surface 54 which serves as an abutment surface against which pivot stud 40 abuts and is stopped from further outward movement when the cargo support platform 12 is pulled outward laterally in preparation of tilting the platform 12 as may be ascertained in FIG. 10, and is the "stop" component of the stop-holder 42 for pivot stud 40. Welded or otherwise securely affixed below flange 44 is a rigid and strong plate such as made of steel and which provides the horizontal surface 56 on which a pivot stud 40 can rest when the platform 12 is in the tilted position. As may be seen in FIG. 10, horizontal surface 56 is sufficiently below the underside of flange 44 to allow the distal end of pivot stud 40 to be moved into the area between the underside of flange 44 and the top of surface 56 wherein when cargo support platform 12 is pulled outward laterally, the pivot studs 40 first abut vertical abutment surface 54 and then the platform 12 can be tilted or pivoted into the tilted position along side the vehicle wherein the pivot studs 40 serves as pivot axles on which the platform pivots with the pivot studs 40 resting upon the top of horizontal surface 56, which is the "holder" component of stop-holder 42. The pivot studs 40 when positioned within stop-holders 42 are sufficiently near to the terminal ends of the main rails 24 of support base 10 that tilting of platform 12 can occur absent interference between the underside (bottom) of guide rails 18, 20 of the platform 12 and the ends 50 of main rails 24 of the support base 10, and when the pivot studs 40 are moved rearward away from stop-holders 42 and the terminal ends 50 of the main rails 24 of support base 10, pivoting or tilting of the platform 12 out of horizontal cannot occur due to interference between the underside of guide rails 18, 20 and the top ends of main rails 24 of the support base 10, and the abutment of the pivot studs 40 against the underside of the flanges 44. It should be appreciated that with a pair of stop-holders 42, one on each end 50 of support base 10 over which a cargo support platform 12 can tilt, the stop-holders 42 need to be positioned such that each pivot stud 40 of the cargo support platform is positioned the same relative to its respective stop-holder 42 when cargo support platform 12 is pulled outward laterally and then tilted, and I simply call this having the ends of the main rails 24 aligned outwardly or straight across from one another.

Figure 10:
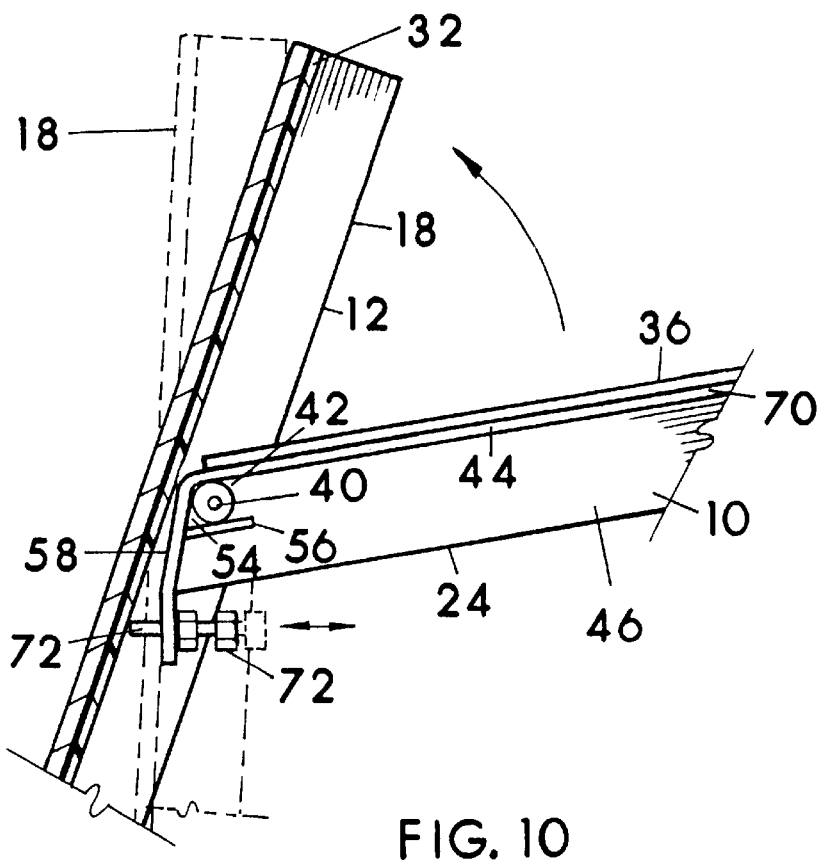
FIG. 10 is an illustrative view with the pivot-stud of the cargo support platform engaged with a stop-holder on the end of the main rail of the support base. The cargo support platform is shown in the tilted position, and the adjustable tilt-stop bolt mounted on the end of the main rail is shown abutted against the back side of the cargo support platform to prevent further tilting. In broken lines, the tilted cargo support base is shown stopped from further tilting by abutment with the end of the main rail of the support base. Portions of the cargo support platform have been cut-away in this view for the showing of certain otherwise hidden components.

The portion of plate 70 extending below the bottom surface of tube 46 on each end tilted over by platform 12 of the main rails provides material to serve as a pivot stop or tilt-stop 58 against which the underside of the cargo support platform 12 can abut to stop further tilting in the tilted state, and as can be seen from FIG. 7 and 10, as an alternative, a bolt 72 can be engaged within a threaded hole in the lower end of plate 70 so as to provide an adjustable tilt-stop surface which the user can adjust by running the bolt 72 further out or less in, as mentioned above, to set the maximum tilt-angle as may be seen in FIG. 10. The bolt 72 end abuts the plastic covered backside interior of the channel iron defining guide rail of cargo support platform 12 and stops further tilting to prevent the downward portion of the cargo support platform from hitting the side of the vehicle. A nut 74 should be added to bolt 72 so that the nut 74 can be tightened against plate 70 to secure bolt 72 in position against vibrating out of its setting once set to provide the desired tilt-angle.

A side strip 38 of slick plastics material is adhered to the side edge of tube 46 adjacent the side edge of plate 70 oppositely disposed from flange 44. The plastic strips on the top and on the sides of the main rails 24 of support base 10 and the guide rails 18, 20 of cargo support platform 12 may be a single piece of plastic bent or formed into a 90 degree piece and secured in place, or multiple strips can be applied. The plastic strip(s) should be about the same length as guide rails 18, 20, and are intended to provide a low friction bearing surface when engaged with their corresponding strips of the other major component, wherein top or upper strips of plastics when mated are intended to carry vertical loading transferred downward from the horizontally disposed cargo support platform 12 into the upper surface of the main rails 24 of support base and to help provide for smooth sliding of cargo support platform 12 on support base 10, and the side strips of plastics 34, 38 when mated are intended to support lateral or sideways loading when the horizontally disposed cargo support platform 12 is moved laterally on support base 10 in order to further aid in providing jam-free movement by providing lateral guidance. The strips of plastics as bearings as herein described have been found by my testing to provide a generally jam-free movement when moving the cargo support platform 12 laterally on the support base 10, and are relatively inexpensive, durable, and lightweight. The strips of plastics are basically the full sliding distance of the cargo support platform 12 and provide a wide surface area for carrying load whether vertical or lateral. The plastic strips herein described on the cargo support platform 12 and support base 10 may be made of any suitable slick and smooth firm plastics material such as Teflon or UHMW (ultra high molecular weight polyethylene or polypropylene) or the like firm yet slick and smooth plastics.

The proper spacing between a pair of main rails 24 of support base 10 is such that the side plastic strips 34 of the guide rails 18, 20 at each oppositely disposed end of the cargo support platform 12 are snug against the side plastic strips 38 of the main rails 24 of support base 10, (or snug directly against the side of main rails 24 if one plastics strip is used per mating rail pair) and with main rails 24 parallel to one another, platform 12 should slide in its horizontal disposition atop support base 10 in a smooth and jam-free manner even when heavily loaded with cargo. The pivot studs 40 positioned underneath the flanges 44 prevent cargo support platform from being lifted or bouncing-off of support base 10. The pivot studs 40 engaged in stop holders 42 prevent the cargo support platform 12 when in the tilted position from disengaging from support base 10. The ends 50 of support base 10 abutting the back side of front member 14 of cargo platform 12 prevent the cargo support platform from being pushed excessively inward relative to support based when the cargo support platform 12 is being pushed laterally over the support base 10 and vehicle to position the platform 12 in a stored position allowing the vehicle to be driven.

Figure 12:
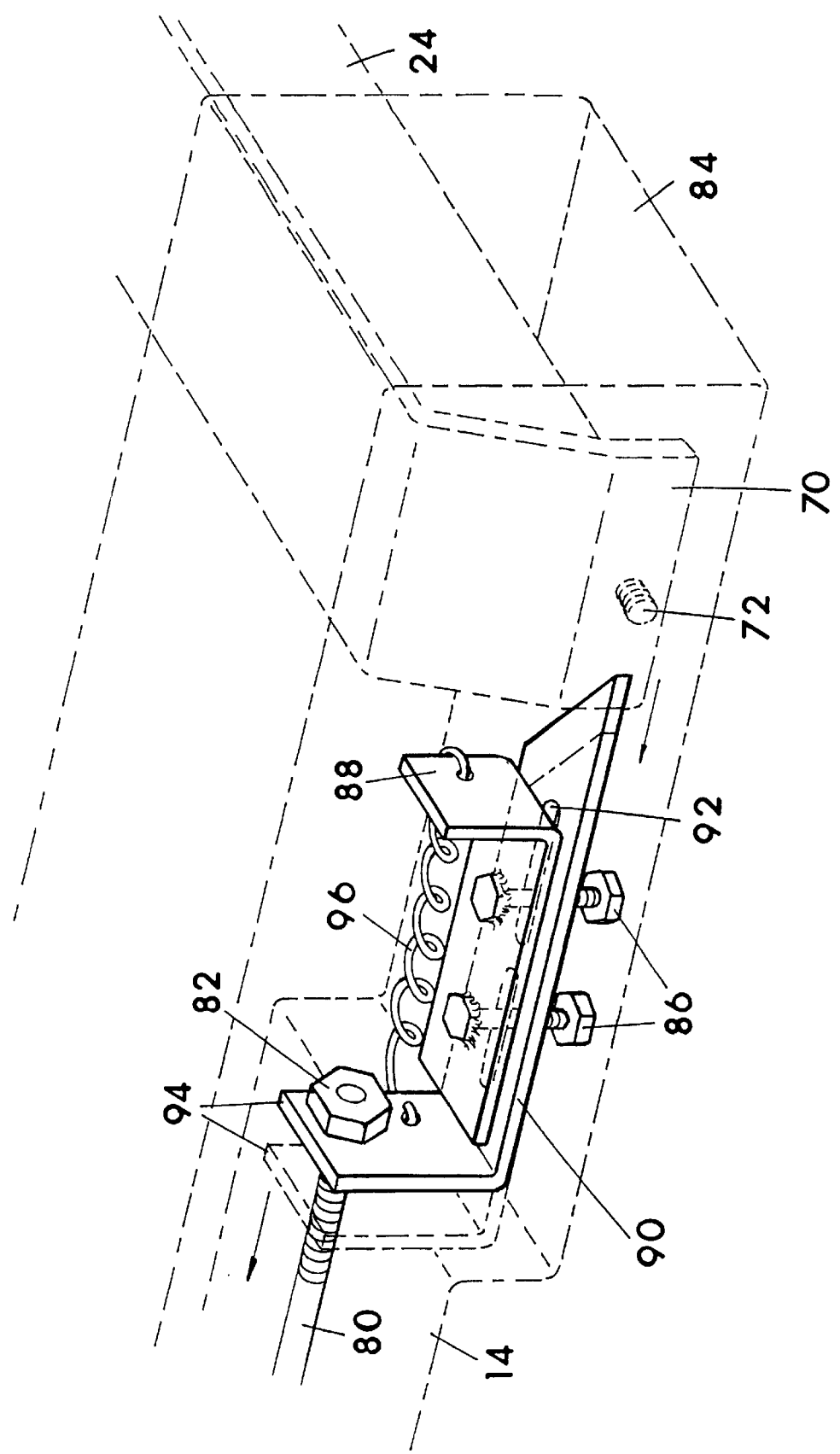
FIG. 12 shows components of the latching arrangement of FIG. 11 for latching the cargo support platform stationary relative to the support base.

With reference now mainly to FIGS. 11 and 12 wherein an example of a suitable latching arrangement is shown for latching or locking cargo support platform 12 stationary when pushed laterally fully inward to support base 10. FIG. 11 is a front view of front member 14 of cargo support platform 12. A lever 76 for grasping and actuating by hand is shown pivotally attached at one end thereof to the back side of front member 14. A return spring 78 is shown attached to the back side of front member 14 and to lever 76 to bias the lever 76 into a first or stored position which is graspable by a human hand to allow pulling the lever 76 into a second position which de-latches or unlocks the cargo support platform 12 as will become appreciated with continued reading. Connected to lever 76 is one end of an elongated rigid rod 80, the connection between the lever 76 and the rod 80 end being pivotal to allow movement of the lever and angular change of the rod to the moved lever 76. Rod 80 extends toward one end of front member 14 wherein the second end of the rod 80 is threaded and possesses a captive nut 82 on its terminal end shown best in FIG. 12. In FIG. 12, a bottom panel 84 has been added to front member 14 to support two vertically extending bolts 86 mounted stationary to bottom panel 84. The upper ends of the bolts 86 are connected to a plate 88 which is held stationary to bolts 86. Positioned beneath plate 88 is a latch plate 90 which is movably sandwiched between the top of bottom panel 84 and the underside of plate 88, and although moveable bi-directionally along a linear axis coextensive with the lengthwise axis of rod 80, latch plate 90 is retained by the passage of bolts 86 through elongated slots 92 in plate 90. One end of latch plate 90 is cut at an angle to form a push-ramp and positioned so that when the terminal downward end of plate 70 of support base 10 engages the angle during the pushing of cargo support platform 12 inward toward the center of the vehicle, the latch plate 90 is pushed in the direction of rod 80 until the end point of the angle of latch plate 90 clears the back side of plate 70, where as will be explained, the latch plate 90 then moves forward or outward to its normal resting position in-part behind plate 70. Latch plate 90 includes an upturned portion 94 having a bore (the bore not shown as it is directly behind and hidden by nut 82) with the second end of rod 80 passing loosely or freely through the bore, and this allows latch plate 90 to be pushed toward lever 76 absent rod 80 moving. The nut 82 of rod 80 positioned on the far side of the upturned portion of latch plate 90 allows lever 76 when manually actuated into the second position to draw rod 80 and nut 82 inward toward lever 76 sufficiently that nut 82 abuts the upturned portion 94 of latch plate 90 and draws latch plate 90 back toward lever 76 which withdraws the angled end of latch plate 90 sufficiently to be pulled away from the plate 70 which allows cargo support platform 12 to be manually pulled laterally outward relative to support base 10. A tension spring 96 has one of its ends connected to stationary plate 88 and the other of its ends connected to the upturned end 94 of latch plate 90 so as to bias latch plate 90 outward toward the end 50 of support base 10 so that when cargo support platform 12 is fully pushed inward, the angled end of latch plate 90 is first pushed back and then snaps outward under spring 96 tension into a position in-part behind plate 70 to secure cargo support platform 12 stationary relative to support base 10 to prevent the platform 12 from sliding outward when the vehicle is driven. Other latching mechanisms can be used, but the one shown in FIGS. 11 and 12 functions well and is relatively inexpensive to build and install, and relatively error resistant for the user, since if the user simply pushes cargo support platform 12 fully inward, the latch plate 90 will automatically latch the cargo support platform 12 stationary to the support base 10.

As previously stated, support base 10 in use is securely mounted to the vehicle. Depending upon the mounting hardware selected, support base 10 can be attached to an existing stationary prior art cargo carrier with which many motor vehicles are presently equipped through the use of suitable interconnecting clamps, or affixed directly to the vehicle exterior rooftop or rooftop rain gutter thereof, or elongated vertical posts may be used as components of the support base mounting hardware to allow mounting the support base to the cargo bed or bed-side top edge of a pick-up truck so that the cargo carrier is significantly elevated above the cargo bed or camper shell covering the cargo bed in a similar manner to many currently in-use lumber and ladder racks on pick-up trucks, which in any mounted arrangement for the purposes of this disclosure the cargo carrier is mounted atop the motor vehicle exterior. There is a vast amount of public knowledge pertaining to many different suitable structural arrangements which could be used to secure a support base such as the present support base 10 or the main rails 24 thereof stationary to a vehicle, and so I will not herein provide any great detail as to specific hardware and techniques which could be used to secure main rails 24 (support base 10) to a vehicle, however drawing FIGS. 14–17 show some examples.

Figure 14:
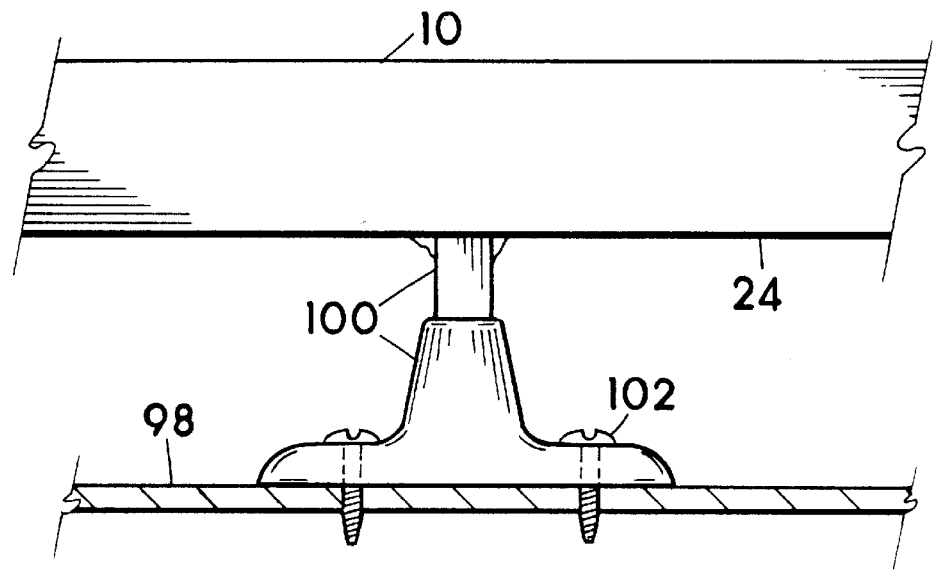
FIG. 14 shows a portion of a main rail of the support base mounted to the top of a vehicle roof using a mounting foot connected at its upper end to the main rail and at its widened bottom foot-like base to the vehicle roof with screws.

FIG. 14 shows a section of one main rail 24 of support base 10 mounted to the top of a vehicle roof 98 using a mounting foot 100 connected at its upper end to the bottom of main rail 24 such as by welding or a threaded engagement, and at its widened bottom foot-like end to the vehicle roof 98 with screws 102. Since as described above support base 10 includes two main rails 24, normally each main rail should have at least two mounting feet or mounting connections to the vehicle roof, and so four mounting feet 100 would be used on a support base 10.

Figure 15:
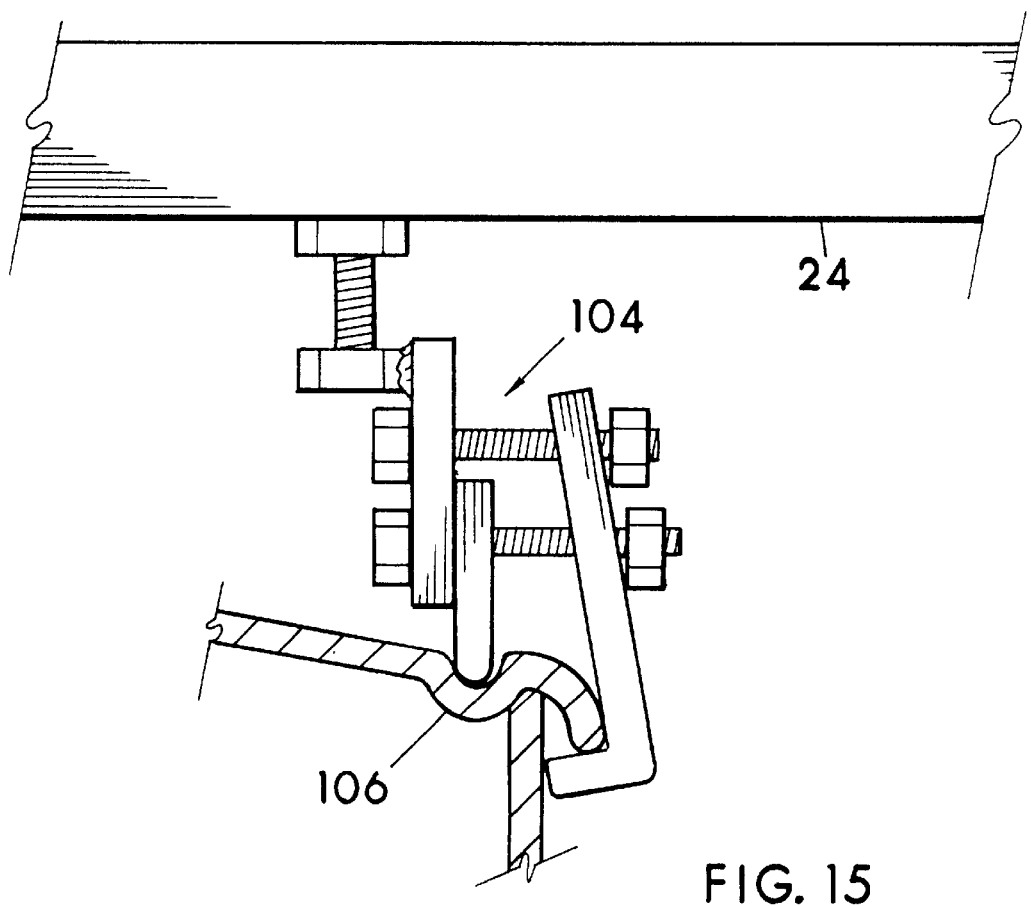
FIG. 15 shows a portion of a main rail of the support base connected by a gutter-mount hardware arrangement to the rain-gutter common on many vehicles.

FIG. 15 shows a section of one main rail 24 of support base 10 connected by a gutter-mount clamping hardware arrangement 104 to the rooftop rain-gutter 106 common on many vehicles, particularly full size vans. Normally four such gutter-mount clamping arrangements 104 would be used on a support base 10, with such a clamping arrangement positioned near each end 50 of each main rail 24.

Figure 16:
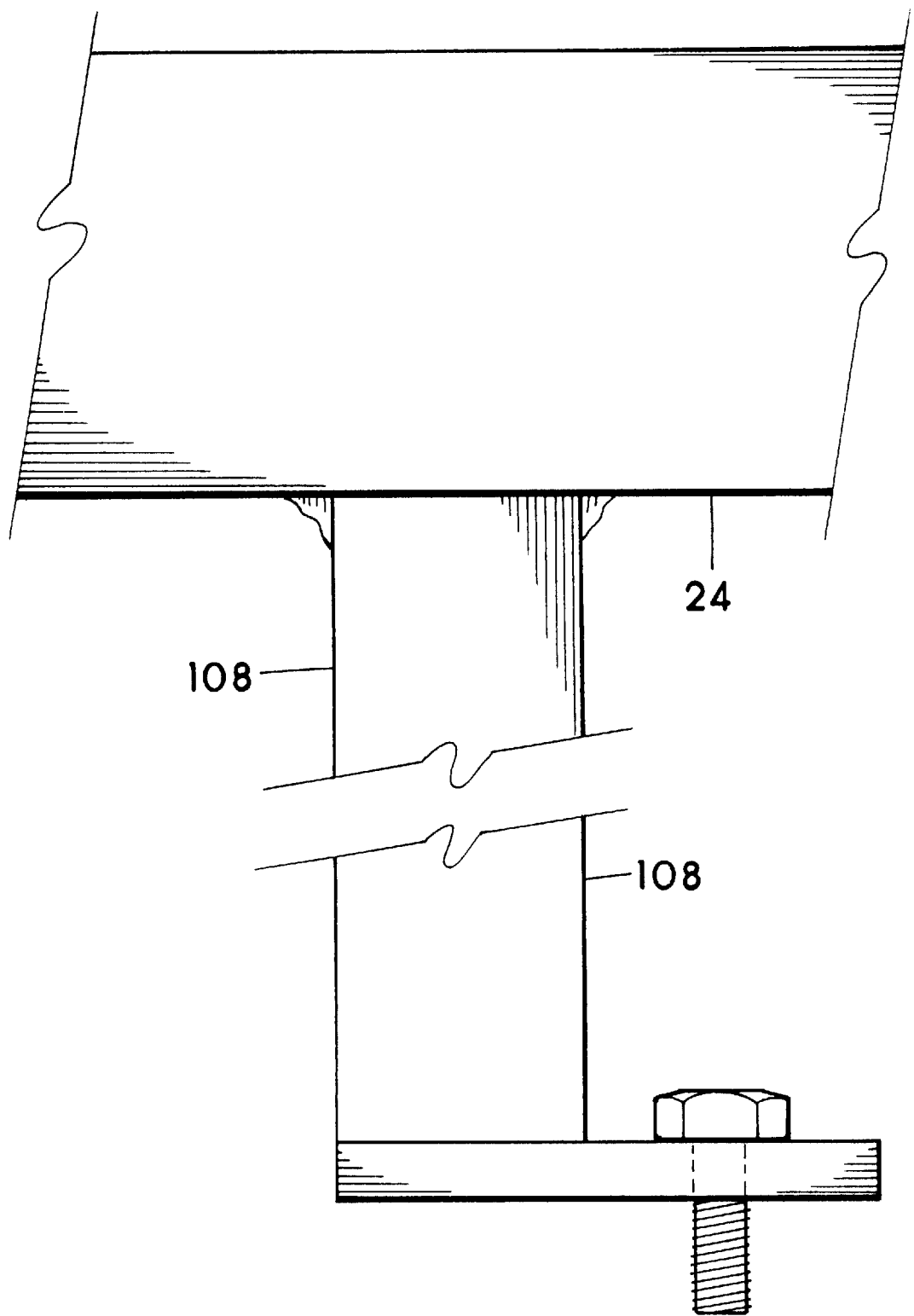
FIG. 16 shows a portion of a main rail of the support base having attached thereto an elongated post suitable for mounting the support base to the cargo bed or the cargo bed top side edge of a pick-up truck wherein the support base would be substantially elevated above the cargo bed through the use of a plurality of such elongated vertical posts.

FIG. 16 shows a section of one main rail 24 of support base 10 having attached thereto such as by welding or bolting, an elongated vertically oriented rigid post 108 suitable for mounting the support base 10 to the cargo bed or the cargo bed top side edge of a pick-up truck wherein the support base 10 (main rails 24 thereof) would be substantially elevated above the cargo bed through the use of a plurality of such elongated vertical posts 108, normally two posts 108 per main rail 24 with each post 108 near an end 50 would be used to mount support base 10.

Figure 17:
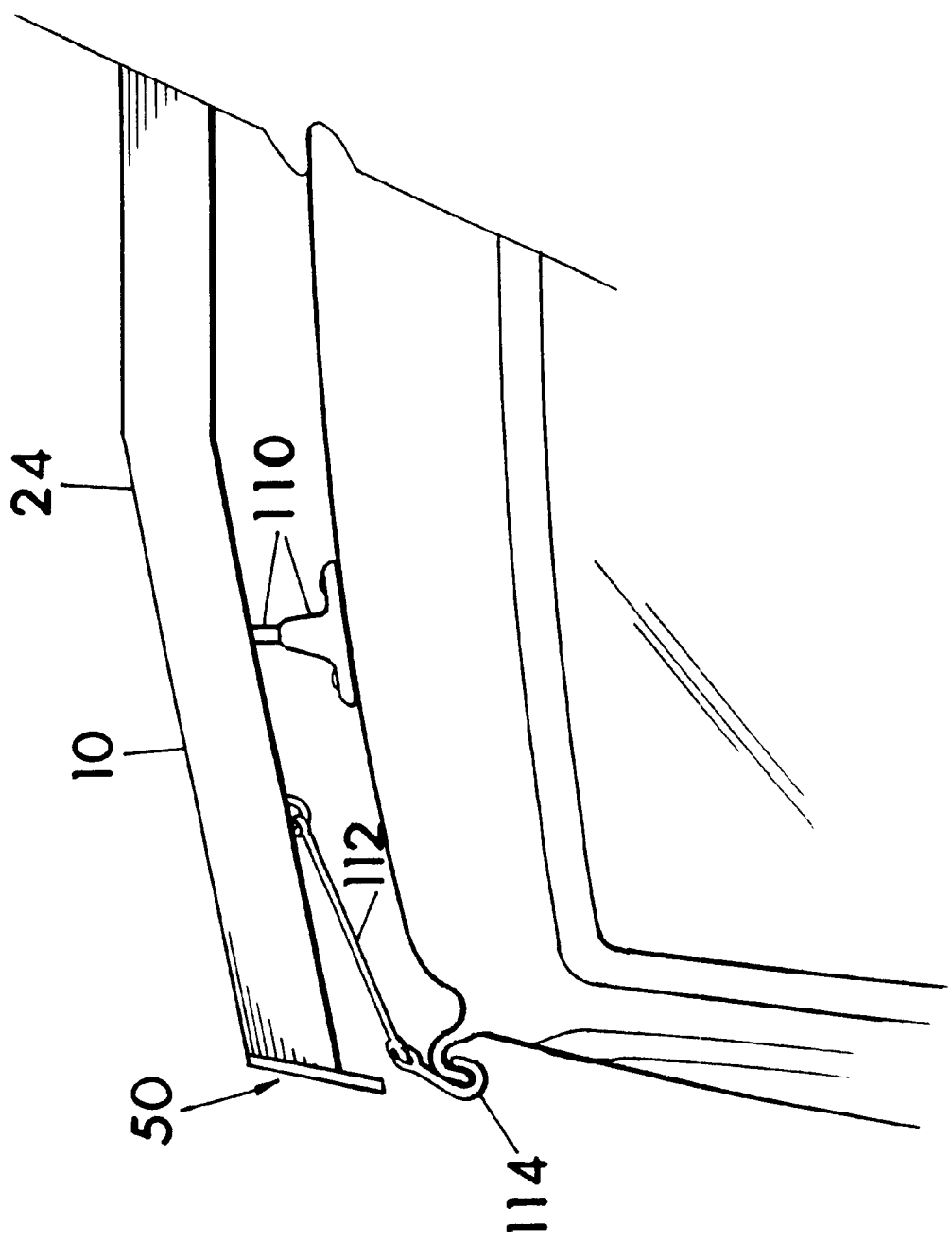
FIG. 17 shows a portion of a main rail of the support base having a suction-cup mounting base and an adjustable length strap with hook for mounting the support base to the rooftop of a vehicle.

FIG. 17 shows a section of one main rail 24 of support base 10 having a suction-cup mounting base 110 and a strap 112 with hook 114 for mounting the support base 10 to the rooftop of a vehicle. Multiple such suction-cup mounting bases 110 and straps 112 with hooks 114, two on each main rail 24 and on oppositely disposed ends of the main rails would be used to mount a support base to a vehicle. The hooks 114 on the ends of the straps 112 hook underneath the lip of either a roof or door edge trim piece or a rain gutter edge or in a door way edge or the like on the vehicle, and the strap 112 is secured to the main rail 24 at an end thereof opposite hook 114 and secured taut typically with an adjustable clasp, as is well known since this is a commonly used mounting arrangement in prior art vehicle cargo carrier mounts.

At this point in the description it should be readily apparent as to how to both build and use the present cargo carrier, however, for the sake of positive clarity, the following may aid the reader in an improved understanding of how to load cargo onto the present cargo carrier in a manner wherein tilt or pivot assistance is gained from the weight of the properly positioned cargo on cargo support platform 12. Assuming the present cargo carrier is mounted atop a vehicle, and the cargo support platform 12 is horizontally disposed and inward of the support base 10 so as to be in a transport position over the vehicle to allow the vehicle to be driven. If one wishes to now load cargo onto the cargo platform 12, the following method will work:

disengage any latches or any like mechanisms rendering the cargo support platform 12 stationary relative to the support base 10 and then manually grasp the near edge (front member 14) of the cargo support platform 12 and pull the platform 12 laterally outward relative to the support base 10 and in-part outward beyond the near or adjacent edge of the vehicle and until further lateral pulling is not possible by the abutment of the pivot studs 40 against the vertical surface 54 of stop-holder 42, manually pivot the cargo support platform 12 in a first direction by pushing downward on front member 14 about the rotational axis defined by the pivot-studs 40 engaged in the stop-holders 42 to position the cargo support platform 12 in a tilted position against a tilt-stop surface 58 or 72 (the end of bolt 72) so further tilting is prohibited with a first portion or lower portion of the cargo support platform 12 positioned elevationally below the rotational axis and a second portion or higher portion of the cargo support platform 12 positioned elevationally above the rotational axis, load cargo onto the cargo support platform 12 and position the weight of the cargo at least in-part on the second portion of the cargo support platform, and if the cargo is not being placed in a cargo box, securing clamp or the like secured stationary to the cargo support platform, then secure the cargo stationary with elastic cords or other suitable securement gear to the cargo support platform so that the cargo does not fall off and so that it remains at least in-part on the second portion of the cargo support platform 12, manually pivot, by way of raising front member 14, the cargo support platform 12 in a second direction toward a less-tilted position which is back toward horizontal wherein the weight of the cargo on the second portion of the cargo support platform will assist you in pivoting the cargo support platform in the second direction to be horizontal atop the support base 10, manually push the cargo support platform 12 laterally inward relative to the support base 10 and over the vehicle, and make sure the cargo support platform 12 is latched or otherwise rendered immobile relative to the support base 10 prior to driving the vehicle.

Although the present cargo carrier is described above and shown in the drawings to include two main rails 24 of support base 10 which are structurally identical to one another and mounted atop the vehicle in spaced and parallel relationship to one another and used to provide stability, connection and support to the two guide rails 18, 20 of cargo support platform 12, the use of a single main rail positioned centrally underneath the cargo support platform 12, with the cargo support platform having a properly shaped and positioned single guide rail to mate with this single main rail support base and to move thereon is imaginable, however the use of a single central main rail and guide rail would require greater strength in the materials connecting between the main and guide rails to provide sufficient stability and strength to allow the cargo platform to support a large amount of cargo weight. Therefore, at least two main rails 24 and two guide rails on cargo support platform are preferably used as described above in reference to preferred embodiments.

Although I have very specifically described the preferred structures of the invention, it should be understood that the specific details are just that, "preferred" structures given for example to those skilled in the art. Some changes, deletions and additions thereof and thereto the specific structures described and shown in the drawings can clearly be made without departing from the scope of the invention, and therefore it must be understood that the true scope of the invention is not to be overly limited by the specification and drawings given for example.

I claim:

1. A cargo carrier, comprising;

a support base mountable atop a motor vehicle, a cargo support platform engaged with said support base and both horizontally slidable and pivotally tiltable relative to said support base for providing access to said cargo support platform in a substantially tilted position, and for transporting cargo on said cargo support platform when in a horizontally disposed position relative to said support base;

pivot axle means engaging between said support base and said cargo support platform for allowing tilting of said cargo support platform relative to said support base; said pivot axle means positioned intermediate of said cargo support platform so that an upper portion and a lower portion of the cargo support platform is provided relative to said pivot axle means when said cargo support.platform is in the tilted position;

said support base having a first rail; said cargo support platform having a first rail interfacing said first rail of said support base; at least a first strip of plastics secured to one of the first rails and residing between interfacing sides of the first rails for providing a low-friction lateral-load bearing surface between the first rails during horizontal sliding of said cargo support platform on said support base; the first strip of plastics positioned to have a portion thereof proximal to a first pivot axle of said pivot axle means; the portion of the first strip of plastics proximal said first pivot axle remaining between the interfacing sides of the first rails of the support base and the cargo support platform when said cargo platform is tilted, whereby at least the portion of the first strip of plastics remains between the first rails and in alignment to reduce shearing forces against the first strip of plastics when the cargo platform is tiltably returned to horizontal;

said support base having a second rail; said cargo support platform having a second rail interfacing said second rail of said support base; at least a second strip of plastics secured to one of the second rails and residing between interfacing sides of the second rails for providing a low-friction lateral-load bearing surface between the second rails during horizontal sliding of said cargo support platform on said support base; the second strip of plastics positioned to have a portion thereof proximal to a second pivot axle of said pivot axle means; the portion of the second strip of plastics proximal said second pivot axle remaining between the interfacing sides of the second rails of the support base and the cargo support platform when said cargo platform is tilted, whereby at least the portion of the second strip of plastics remains between the second rails and in alignment to reduce shearing forces against the second strip of plastics when the cargo platform is tiltably returned to horizontal;

vertical load supporting elongate strips of plastics positioned between an underside surface of said cargo support platform and an interfacing upper surface of said support base for providing vertical load supporting bearing surfaces for providing low friction when sliding said cargo support platform horizontally on said support base;

tilt-stop means engagable between said support base and said cargo support platform for restricting said cargo support platform against being tilted in the tilted position beyond a pre-determined tilt-angle relative to said support base; said tilt-stop means including user selectable adjustment means for allowing user selection of said pre-determined tilt-angle, said tilt-stop means with said adjustment means comprising a bolt threadably engaged in an end of said support base and extending outward to abut said cargo support platform when tilted for restricting further tilting; the outward extension of said bolt being adjustable by way of rotating the bolt.

2. A cargo carrier, comprising;

a support base mountable atop a motor vehicle, and a cargo support platform engaged with said support base; said cargo support platform both horizontally slidable and pivotally tiltable relative to said support base for providing access to said cargo support platform in a tilted position, and for transporting cargo on said cargo support platform when in a horizontally disposed position relative to said support base;

pivot axles engaging between said support base and said cargo support platform for allowing the tilting of said cargo support platform relative to said support base; said pivot axles positioned intermediate of said cargo support platform so that an upper portion and a lower portion of the cargo support platform is provided relative to said pivot axles when said cargo support platform is in the tilted position;

said support base having a first rail; said cargo support platform having a first rail interfacing said first rail of said support base; at least a first strip of plastics secured to one of the first rails and residing between sides of the first rails for providing a low-friction lateral-load bearing surface between the first rails during horizontal sliding of said cargo support platform on said support base; the first strip of plastics positioned to have a portion thereof remaining between the side of the first rails of the support base and the cargo support platform when said cargo platform is tilted;

said support base having a second rail; said cargo support platform having a second rail interfacing said second rail of said support base; at least a second strip of plastics secured to one of the second rails and residing between sides of the second rails for providing a low-friction lateral-load bearing surface between the second rails during horizontal sliding of said cargo support platform on said support base; the second strip of plastics positioned to have a portion thereof remaining between the sides of the second rails of the support base and the cargo support platform when said cargo platform is tilted;

vertical load supporting elongate strips of plastics positioned between a bottom surface of said cargo support platform and a top surface of said support base for providing vertical load supporting bearing surfaces for providing low friction when sliding said cargo support platform horizontally on said support base;

a tilt-stop member engagable between said support base and said cargo support platform for restricting said cargo support platform against being tilted in the tilted position beyond a pre-determined tilt-angle relative to said support base, said tilt-stop member at least in part adjustably positionable by a human user so that the position of the engagement of the tilt-stop member between said support base and said cargo support platform can be selected, whereby selecting the position of engagement the user can select a tilt-angle restriction.

3. A cargo carrier, comprising;

a support base mountable atop a motor vehicle, and a cargo support platform engaged with said support base; said cargo support platform both horizontally slidable and pivotally tiltable relative to said support base for providing access to said cargo support platform in a tilted position, and for transporting cargo on said cargo support platform when in a horizontally disposed position relative to said support base;

pivot axles engaging between said support base and said cargo support platform for allowing the tilting of said cargo support platform relative to said support base; said pivot axles positioned intermediate of said cargo support platform so that an upper portion and a lower portion of the cargo support platform is provided relative to said pivot axles when said cargo support platform is in the tilted position;

said support base having a first rail; said cargo support platform having a first rail interfacing said first rail of said support base; at least a first elongated strip of lubricating material applied to one of the first rails and residing between sides of the first rails for providing a low-friction lateral-load bearing surface between the first rails during horizontal sliding of said cargo support platform on said support base; the first elongated strip of lubricating material positioned to have a portion thereof remaining between the side of the first rails of the support base and the cargo support platform when said cargo platform is tilted;

said support base having a second rail; said cargo support platform having a second rail interfacing said second rail of said support base; at least a second elongated strip of lubricating material applied to one of the second rails and residing between sides of the second rails for providing a low-friction lateral-load bearing surface between the second rails during horizontal sliding of said cargo support platform on said support base; the second elongated strip of lubricating material positioned to have a portion thereof remaining between the sides of the second rails of the support base and the cargo support platform when said cargo platform is tilted;

vertical load supporting elongated strips of lubricating material positioned between a bottom surface of said cargo support platform and a top surface of said support base for providing vertical load supporting bearing surfaces for providing low friction when sliding said cargo support platform horizontally on said support base;

a tilt-stop member engagable between said support base and said cargo support platform for restricting said cargo support platform against being tilted in the tilted position beyond a pre-determined tilt-angle relative to said support base, said tilt-stop member at least in part adjustably positionable by a human user so that the position of the engagement of the tilt-stop member between said support base and said cargo support platform can be selected, whereby selecting the position of engagement the user can select a tilt-angle restriction.

* * * * *